(12) United States Patent
Fujioka et al.

(10) Patent No.: US 8,998,425 B2
(45) Date of Patent: Apr. 7, 2015

(54) IMAGE PROJECTION APPARATUS

(71) Applicants: Tetsuya Fujioka, Kanagawa (JP);
Masamichi Yamada, Kanagawa (JP);
Yasutada Tsukioka, Kanagawa (JP);
Naoyuki Ishikawa, Kanagawa (JP);
Hideo Kanai, Tokyo (JP)

(72) Inventors: Tetsuya Fujioka, Kanagawa (JP);
Masamichi Yamada, Kanagawa (JP);
Yasutada Tsukioka, Kanagawa (JP);
Naoyuki Ishikawa, Kanagawa (JP);
Hideo Kanai, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 107 days.

(21) Appl. No.: 13/644,687

(22) Filed: Oct. 4, 2012

(65) Prior Publication Data

US 2013/0114045 A1    May 9, 2013

(30) Foreign Application Priority Data

Nov. 4, 2011   (JP) ................................. 2011-242923

(51) Int. Cl.
*G03B 21/16*   (2006.01)
*H04N 9/31*    (2006.01)

(52) U.S. Cl.
CPC .............. *G03B 21/16* (2013.01); *H04N 9/3144* (2013.01)

(58) Field of Classification Search
USPC .................... 353/57, 58, 60, 61; 362/264, 373
See application file for complete search history.

(56) References Cited

U.S. PATENT DOCUMENTS

| 5,860,719 | A | 1/1999 | Suzuki et al. |
| 6,693,381 | B2 | 2/2004 | Bell et al. |
| 7,901,084 | B2 | 3/2011 | Willey et al. |
| 8,801,198 | B2 | 8/2014 | Hirosawa |
| 8,820,944 | B2 | 9/2014 | Vasquez |
| 2004/0156117 | A1 | 8/2004 | Takaura et al. |
| 2005/0264766 | A1* | 12/2005 | Morimoto et al. ............ 353/61 |
| 2006/0274290 | A1 | 12/2006 | Sakurai |
| 2007/0019168 | A1 | 1/2007 | Nakagawa et al. |
| 2007/0182934 | A1 | 8/2007 | Noda et al. |
| 2007/0291238 | A1 | 12/2007 | Yanagisawa et al. |
| 2008/0049193 | A1 | 2/2008 | Zheng et al. |
| 2008/0094582 | A1 | 4/2008 | Nakagawa et al. |
| 2009/0135378 | A1* | 5/2009 | Lin et al. ........................ 353/61 |

(Continued)

FOREIGN PATENT DOCUMENTS

| CN | 1677225 A | 10/2005 |
| CN | 101067713 A | 11/2007 |

(Continued)

OTHER PUBLICATIONS

Office Action and Search Report issued on Jul. 30, 2014 in the corresponding Chinese Patent Application No. 201210595735.4 (with an English Translation).

(Continued)

*Primary Examiner* — William C Dowling
(74) *Attorney, Agent, or Firm* — Oblon, Spivak, McClelland, Maier & Neustadt, L.L.P.

(57) ABSTRACT

An image projection apparatus for projecting an image using light includes a light source configured to emit the light; and an operating unit configured to allow a user to operate the image projection apparatus, the operating unit being disposed above the light source when viewed from a placement surface on which a main body of the image projection apparatus is placed. The image projection apparatus also includes a first flow path in which air flows through the light source; and a second flow path different from the first flow path, the second flow path being formed between the light source and the operating unit.

9 Claims, 24 Drawing Sheets

(56) References Cited

U.S. PATENT DOCUMENTS

| | | |
|---|---|---|
| 2010/0128230 A1 | 5/2010 | Kotaka et al. |
| 2011/0188008 A1 | 8/2011 | Maeda et al. |
| 2013/0182429 A1 | 7/2013 | Belliveau et al. |

FOREIGN PATENT DOCUMENTS

| | | |
|---|---|---|
| CN | 101144963 A | 3/2008 |
| CN | 101639208 A | 2/2010 |
| EP | 1 542 460 A1 | 6/2005 |
| JP | 2000-330206 A | 11/2000 |
| JP | 2002-244210 | 8/2002 |
| JP | 2005-338325 | 12/2005 |
| JP | 2006-259290 A | 9/2006 |
| JP | 3924054 | 3/2007 |
| JP | 2008-102374 | 5/2008 |
| JP | 2009-3158 A | 1/2009 |
| JP | 2011-158523 A | 8/2011 |
| WO | 2011/093234 A1 | 8/2011 |
| WO | WO 2011/111186 A1 | 9/2011 |

OTHER PUBLICATIONS

Office Action issued Jul. 18, 2014, in Japanese Patent Application No. 2011-242923.

Extended European Search Report issued in European Application No. 12187819.3 on Sep. 30, 2014.

Office Action issued Oct. 3, 2014 in co-pending U.S. Appl. No. 14/454,431.

Notice of Allowance and Fee(s) Due issued in U.S. Appl. No. 14/454,431 on Dec. 11, 2014.

\* cited by examiner

IMAGE PROJECTION APPARATUS

CROSS-REFERENCE TO RELATED APPLICATION

The present application claims priority to and incorporates by reference the entire contents of Japanese Patent Application No. 2011-242923 filed in Japan on Nov. 4, 2011.

BACKGROUND OF THE INVENTION

1. Field of the Invention

The present invention relates to an image projection apparatus.

2. Description of the Related Art

Image projection apparatuses have been known that include digital mirror devices (DMDs) serving as image forming elements that modulate light on the basis of image data supplied from personal computers, for example, and image forming units having irradiation units irradiating the image forming elements by light from light sources, and in which the image forming units form images and the images formed by the image forming units are focused on projection planes using projection optical sections.

The image projection apparatuses use halogen lamps, metal halide lamps, or high-pressure mercury lamps as the light sources. These lamps reach a high temperature when emitting light. Japanese Patent Application Laid-open No. 2002-244210 and Japanese Patent Application Laid-open No. 2008-102374 disclose image projection apparatuses. In an example of the image projection apparatuses, ambient air is taken in from an intake port provided to the apparatus by an air supplying unit such as a blower or a fan, the air taken in is supplied to a light source to cool the light source, and air of which the temperature has increased by taking heat from the light source is discharged outside the apparatus via an exhaust port.

An operating unit serving as an input mechanism such as buttons for a user to operate the image projection apparatus is preferably disposed on the upper surface of the image projection apparatus for allowing the user to readily operate the image projection apparatus.

The temperature of the light source reaches up to about 1000° C. even though the light source is cooled by supplied air. As a result, air heated by the light source flows upward by air supplied from an air supplying unit and its ascending air current. In addition, heat from the light source is conducted toward the operating unit by thermal conduction. When the operating unit is disposed above or just above the light source, a problem arises in that air heated by the light source and flowing upward, heat by the thermal conduction, and heat by natural convection collide with the operating unit disposed above or just above the light source and the operating unit is heated by the heated air and the heat, thereby increasing the temperature of the operating unit.

Therefore, there is a need for an image projection apparatus capable of suppressing an increase in the temperature of an operating unit even when the operating unit is disposed above or just above a light source.

SUMMARY OF THE INVENTION

It is an object of the present invention to at least partially solve the problems in the conventional technology.

According to an embodiment, there is provided an image projection apparatus for projecting an image using light. The image projection apparatus includes a light source configured to emit the light; and an operating unit configured to allow a user to operate the image projection apparatus, the operating unit being disposed above the light source when viewed from a placement surface on which a main body of the image projection apparatus is placed. The image projection apparatus also includes a first flow path in which air flows through the light source; and a second flow path different from the first flow path, the second flow path being formed between the light source and the operating unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Figure 1:
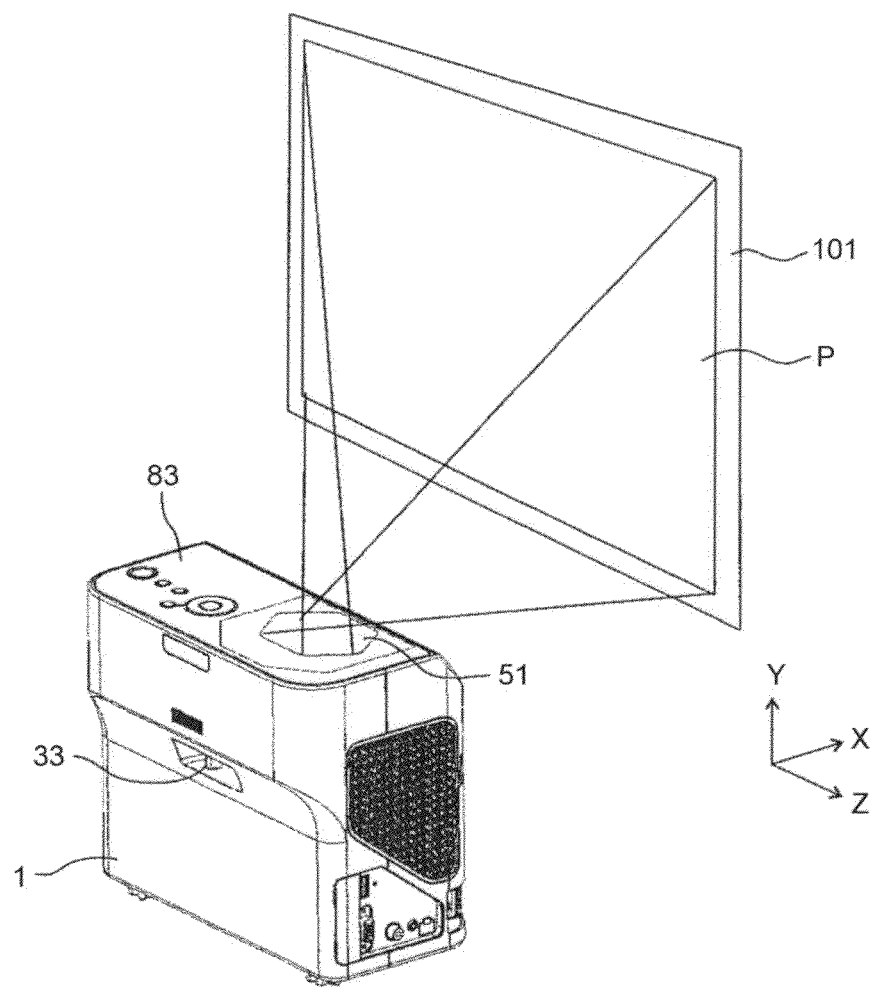
FIG. 1 is a perspective view illustrating a projector according to an embodiment of the invention and a projection plane.

Embodiments of a projector that is an image projection apparatus to which the invention is applied is described below. FIG. 1 is a perspective view illustrating a projector 1 according to an embodiment and a projection plane 101 such as a screen. The projector 1 is also referred to as the apparatus in the following description. In the following description, the normal line direction of the projection plane 101 is defined as an X direction, a short-axis direction (up-down direction) of the projection plane 101 is defined as a Y direction, and a long-axis direction (horizontal direction) of the projection plane 101 is defined as a Z direction.

As illustrated in FIG. 1, a transmissive glass 51 through which a projection image P is emitted is provided on an upper surface of the projector 1. The projection image P emitted from the transmissive glass 51 is projected on the projection plane 101 such as a screen.

An operating unit 83 for a user to operate the projector 1 is also provided on the upper surface of the projector 1. A focusing lever 33 for a focus adjustment is provided on a side surface of the projector 1. Operating the operating unit 83 including a known input mechanism such as buttons, a user can adjust a tint and contrast of the projection image P and perform setting of a network such as Internet protocol address (IP address) setting.

Figure 2:
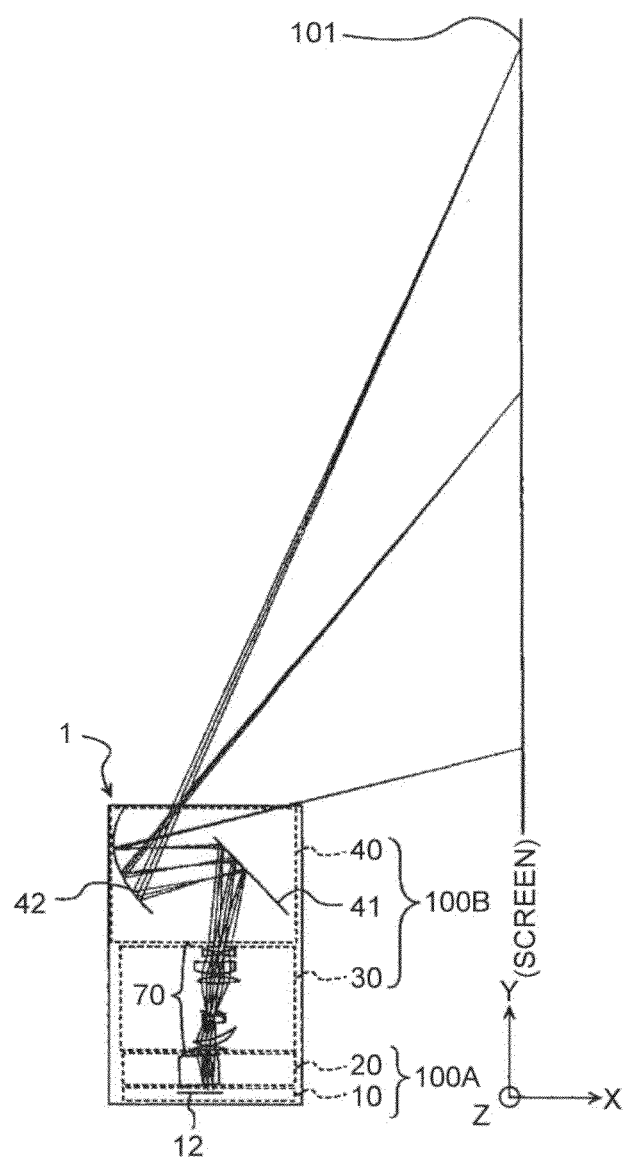
FIG. 2 is a ray diagram from the projector to the projection plane.

FIG. 2 is a ray diagram from the projector 1 to the projection plane 101.

The projector 1 includes a light source unit (not illustrated) provided with a light source and an image forming section 100A that forms an image using light from the light source. The image forming section 100A is made up of an image forming unit 10 provided with a digital mirror device (DMD) 12 and a lighting unit 20 that reflects light from the light source and irradiates the DMD 12 with the reflected light to cause the DMD 12 to produce an optical image. In addition, the projector 1 includes a projection optical section 100B for projecting an image on the projection plane 101. The projection optical section 100B is made up of a first optical unit 30 including at least one transmissive refracting optical system and a coaxial first optical system 70 having positive power, and a second optical unit 40 including a reflection mirror 41 and a curved mirror 42 having positive power.

The DMD 12 is irradiated with light by the lighting unit 20 that reflects light from the light source (not illustrated), and produces an image by modulating light emitted from the lighting unit 20. The image produced by the DMD 12 is projected on the projection plane 101 through the first optical system 70 of the first optical unit 30, and the reflection mirror 41 and the curved mirror 42 of the second optical unit 40.

Figure 3:
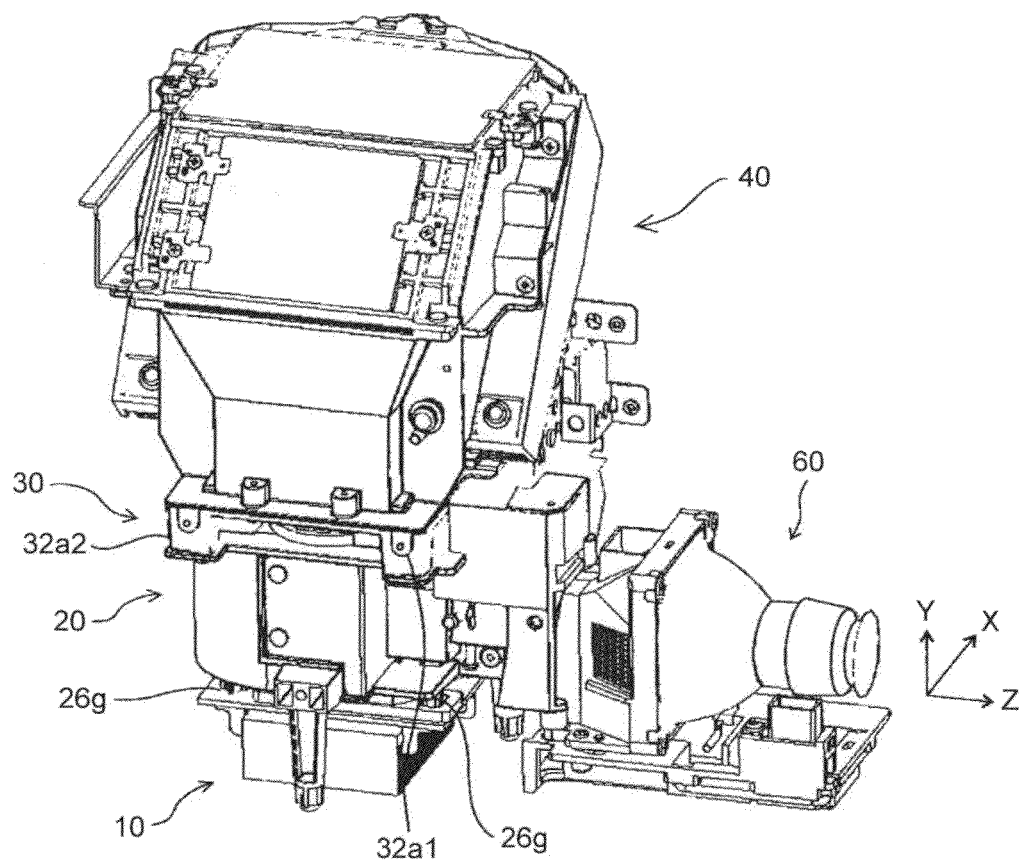
FIG. 3 is a schematic perspective view illustrating an internal structure of the projector.

FIG. 3 is a schematic perspective view illustrating an internal structure of the projector 1.

As illustrated in FIG. 3, the image forming unit 10, the lighting unit 20, the first optical unit 30, and the second optical unit 40 are arranged in the Y direction, which is one of the directions parallel to the projection plane 101 and the image plane of the projection image P. A light source unit 60 is disposed on the right side of the lighting unit 20 in FIG. 3.

FIG. 3 also illustrates legs 32a1 and 32a2 of a lens holder 32 (refer to FIG. 9) of the first optical unit 30, and screw fixing portions 26g that fix the image forming unit 10 to the lighting unit 20 with screws.

Figure 4:
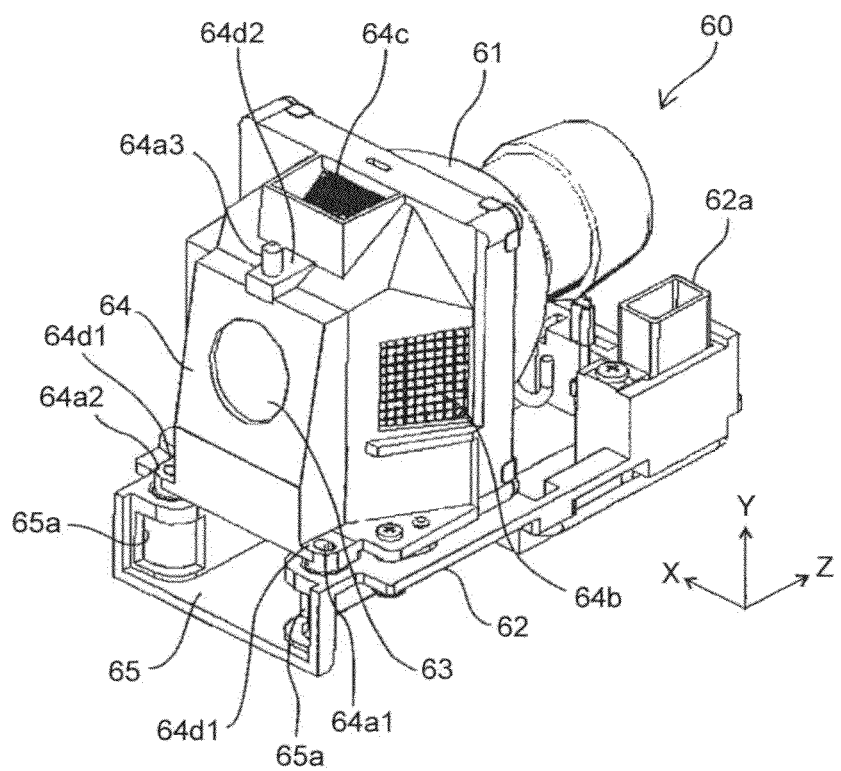
FIG. 4 is a schematic perspective view of a light source unit.

The structure of each unit is described in detail below.
The structure of the light source unit 60 is described below.
FIG. 4 is a schematic perspective view of the light source unit 60.

The light source unit 60 has a light source bracket 62. A light source 61 such as a halogen lamp, a metal halide lamp, or a high-pressure mercury lamp is mounted above the light source bracket 62. The light source bracket 62 is provided with a connector 62a that connects to a power source side connector (not illustrated) connected to a power source unit 80 (refer to FIG. 14).

A holder 64 that holds a reflector (not illustrated), for example, is fixed with screws to a light emission side of the light source 61, which is mounted above the light source bracket 62. An emission window 63 is provided on a surface opposite the surface on which light source 61 is provided of the holder 64. Light emitted from the light source 61 is converged to the emission window 63 by the reflector (not illustrated) held by the holder 64, and emitted from the emission window 63.

Light source positioning portions 64a1 to 64a3 are provided on the upper surface of the holder 64 and on the lower surface of the holder 64 at both ends in the X direction, and used for positioning the light source unit 60 to a lighting bracket 26 (refer to FIG. 6) of the lighting unit 20. The light source positioning portion 64a3 provided on the upper surface of the holder 64 is formed in a projection shape while the light source positioning portions 64a1 and 64a2 provided on the lower surface of the holder 64 are formed as holes.

A light source air intake port 64b through which air flows to cool the light source 61 is provided on a side surface of the holder 64 while a light source air exhaust port 64c through which air heated by the light source 61 is discharged is provided on the upper surface of the holder 64.

The light source bracket 62 is provided with a passage 65 through which air sucked in by an air intake blower 91 (e.g., refer to FIG. 21) flows, which is described later. An opening 65a is provided on an air flow-in side of the passage 65, i.e., on the lower left side in FIG. 4. The opening 65a allows part of air flowing through the passage 65 to flow between the light source unit 60 and an open-close cover 54 (refer to FIG. 18), which is described later. Cooling of the light source unit 60 is described later.

A planar section 64d2 on which the light source positioning portion 64a3 is provided and a planar section 64d1 on which the light source positioning portions 64a1 and 64a2 are provided, both of which are illustrated in FIG. 4, are abutting sections that abut the lighting bracket 26 when being pushed by a pushing unit of the open-close cover 54.

Figure 5:
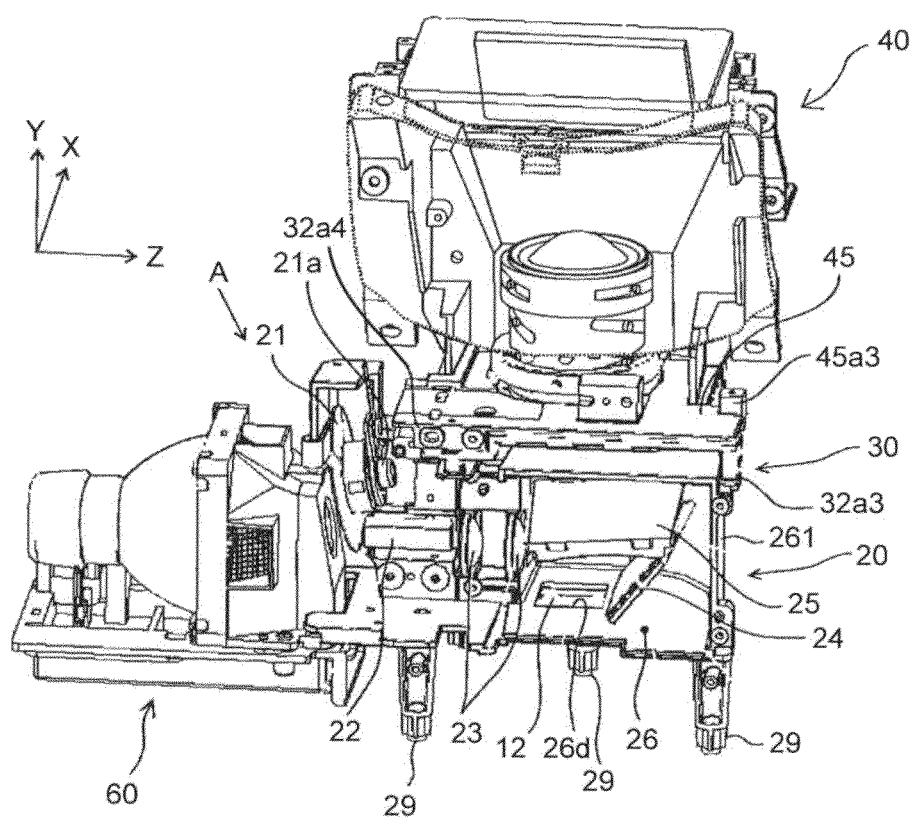
FIG. 5 is a perspective view illustrating optical system parts housed in a lighting unit and the other units.

The lighting unit 20 is described below. FIG. 5 is a perspective view illustrating optical system parts housed in the lighting unit 20 and the other units.

As illustrated in FIG. 5, the lighting unit 20 includes a color wheel 21, a light tunnel 22, two relay lenses 23, a cylinder mirror 24, and a concave mirror 25, which are held by the lighting bracket 26. The lighting bracket 26 has a housing-like section 261 in which the two relay lenses 23, the cylinder mirror 24, and the concave mirror 25 are housed. The housing-like section 261 only has a side surface on the right side in FIG. 5. The other three sides of the housing-like section 261 are open. An OFF light plate 27 (refer to FIG. 6) is attached to an opening provided on the side surface on a far side in the X direction while a cover member (not illustrated in all of the drawings) is attached to an opening provided on the side surface on a near side in the X direction. As a result, the two relay lenses 23, the cylinder mirror 24, and the concave mirror 25 housed in the housing-like section 261 of the lighting bracket 26 are covered with the lighting bracket 26, the OFF light plate 27 (refer to FIG. 6), and the cover member which is not illustrated in all of the drawings.

The housing-like section 261 of the lighting bracket 26 has, on the lower surface thereof, an irradiation through-hole 26d out of which the DMD 12 is exposed.

The lighting bracket 26 has three legs 29. The legs 29 abut a base member 53 (refer to FIG. 13) and support the weights of the first optical unit 30 and the second optical unit 40 that are stacked and fixed on the lighting bracket 26. In addition, the legs 29 thus provided form a space through which ambient air flows to a heat sink 13 (refer to FIG. 6) serving as a cooling unit that cools the DMD 12 of the image forming unit 10, which is described later.

FIG. 5 also illustrates legs 32a3 and 32a4 of the lens holder 32 of the first optical unit 30, and a screw fixing portion 45a3 of the second optical unit 40.

Figure 6:
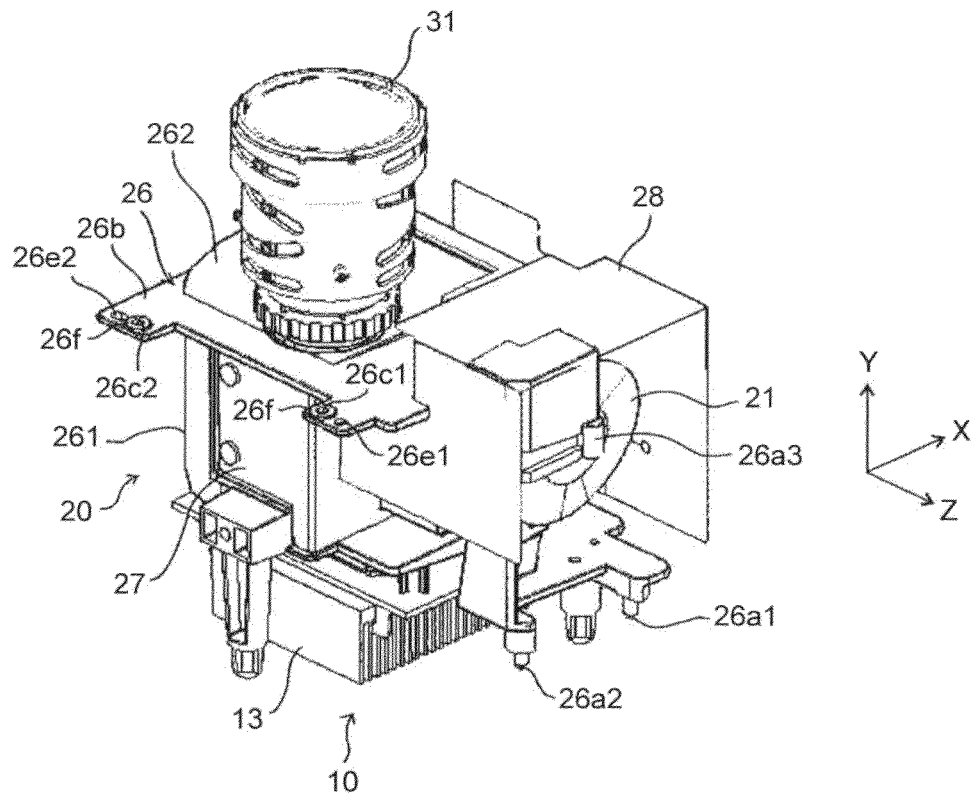
FIG. 6 is a perspective view when the lighting unit, a projection lens unit, and an image forming unit are viewed from direction A of FIG. 5.

FIG. 6 is a perspective view when the lighting unit 20, a projection lens unit 31, and the image forming unit 10 are viewed from direction A of FIG. 5.

An upper surface 26b orthogonal to the Y direction is provided on the housing-like section 261 of the lighting bracket 26. A through-hole is provided at each of the four corners of the upper surface 26b (in FIG. 6, only through-holes 26c1 and 26c2 are illustrated and the other through-holes 26c3 and 26c4 are not illustrated). Screws for fixing the first optical unit 30 are inserted in the through-holes. Positioning holes 26e1 and 26e2 for positioning the first optical unit 30 to the lighting unit 20 are provided adjacent to the through-holes 26c1 and 26c2, respectively, located on the near side in the X direction. In the two positioning holes provided on the near side in the X direction, the positioning hole 26e1 on the color wheel 21 side is a primary reference for the positioning and formed as a round hole while the positioning hole 26e2 on a side away from the color wheel 21 is a secondary reference for the positioning and formed as an elongate hole extending in the Z direction. The surrounding area of each of the through-holes 26c1 and 26c2 is protruded from the upper surface 26b of the lighting bracket 26 and serves as a positioning protrusion 26f for positioning the first optical unit 30 in the Y direction. When positioning accuracy in the Y direction is intended to be increased without the positioning protrusions 26f, flatness of the whole upper surface of the lighting bracket 26 needs to be increased, resulting in high costs. In contrast, by the positioning protrusions 26f thus provided, the flatness of the positioning protrusions 26f only needs to be increased. As a result, costs can be reduced and the positioning accuracy in the Y direction can be increased.

A light shielding plate 262 to which the lower portion of the projection lens unit 31 is fitted is provided to an opening on the upper surface 26b of the lighting bracket 26. The light shielding plate 262 prevents light from entering the housing-like section 261 from above.

An area between the through-holes 26c1 and 26c2 of the upper surface 26b of the lighting bracket 26 is notched so as not to hinder the fixing of the second optical unit 40 to the first optical unit 30 with screws, which is described later.

A light source positioning receiving portion 26a3 having a tubular shape is provided at an end on the color wheel 21 side of the lighting bracket 26 (on the near side in the Z direction). The light source positioning receiving portion 26a3 has a through-hole in the up-down direction in which the light source positioning portion 64a3 having a protrusion shape provided on the upper surface of the holder 64 of the light source unit 60 (refer to FIG. 4) is fitted. Under the light source positioning receiving portion 26a3, two light source positioning receiving portions 26a1 and 26a2 having a protrusion shape are provided in which the light source positioning portions 64a1 and 64a2 that are formed as holes and provided on the light source bracket 62 side of the holder 64 are fitted. The light source positioning portions 64a1 to 64a3 of the holder 64 are fitted in the light source positioning receiving portions 26a1 to 26a3 provided to the lighting bracket 26 of the lighting unit 20, resulting in the light source unit 60 being positioned and fixed to the lighting unit 20 (refer to FIG. 3).

A lighting cover 28 that covers the color wheel 21 and the light tunnel 22 is attached to the lighting bracket 26.

Figure 7:
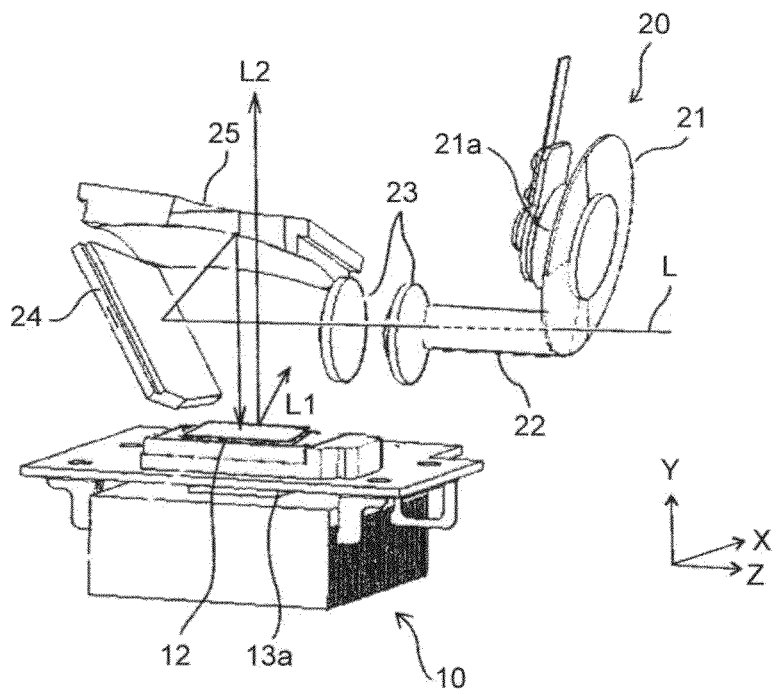
FIG. 7 is a schematic diagram explaining an optical path of light in the lighting unit.

FIG. 7 is a schematic diagram to explain an optical path L of light in the lighting unit 20.

The color wheel 21, which has a discoid shape, is fixed to a motor shaft of a color motor 21a. The color wheel 21 has filters of red (R), green (G), and blue (B) provided in a rotational direction thereof, for example. Light converged by the reflector (not illustrated) provided to the holder 64 of the light source unit 60 passes through the emission window 63 and reaches a circumferential edge of the color wheel 21. Light having reached the circumferential edge of the color wheel 21 is divided into light components of R, G, and B by the rotation of the color wheel 21 in a time division manner.

The light components divided by the color wheel 21 enter the light tunnel 22. The light tunnel 22 has a square tubular shape and an inner circumferential surface of the light tunnel 22 is a mirror surface. Light having entered the light tunnel 22 becomes a uniform surface light source while repeating reflection on the inner circumferential surface of the light tunnel 22 a plurality of times and is emitted toward the relay lenses 23.

Light after passing through the light tunnel 22 travels through the two relay lenses 23, and is reflected by the cylinder mirror 24 and the concave mirror 25, and converged on an image forming surface of the DMD 12.

The image forming unit 10 is described below.

Figure 8:
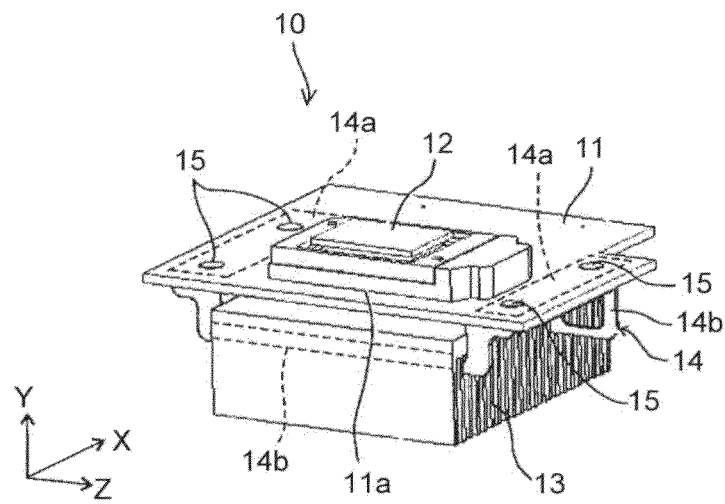
FIG. 8 is a perspective view of the image forming unit.

FIG. 8 is a schematic perspective view of the image forming unit 10.

As illustrated in FIG. 8, the image forming unit 10 includes a DMD board 11 to which the DMD 12 is attached. The DMD 12 is attached to a socket 11a provided on the DMD board 11 such that the image forming surface, on which micro mirrors are arranged in matrix, faces upward. The DMD board 11 is provided with a driving circuit that drives the DMD mirrors, for example. The heat sink 13 serving as the cooling unit cooling the DMD 12 is fixed to a rear surface (a surface opposite the surface on which the socket 11a is provided) of the DMD board 11. A portion to which the DMD 12 is attached of the DMD board 11 is formed as a through-hole (not illustrated). The heat sink 13 has a protrusion 13a (refer to FIG. 7) that is inserted in the through-hole. The tip of the protrusion 13a has a planer shape. The protrusion 13a is inserted in the through-hole (not illustrated) and the planar surface of the tip of the protrusion 13a is abutted to the rear surface (the surface opposite the image forming surface) of the DMD 12. An elastically formable heat-transfer sheet may be attached to the planar surface or the area to which the heat sink 13 is abutted of the rear surface of the DMD 12 so as to enhance adhesiveness and thermal conductivity between the planar surface of the protrusion 13a and the rear surface of the DMD 12.

The heat sink 13 is pushed and fixed to the surface opposite the surface on which the socket 11a is provided of the DMD board 11 by a fixing member 14. The fixing member 14 has platy fixing sections 14a on the rear surface of the DMD board 11 on the right side and the left side in FIG. 8. Pushers 14b are provided near one end and the other end of the respective fixing sections 14a in the X direction so as to connect the fixing sections 14a.

The heat sink 13 is pushed and fixed to the surface opposite the surface on which the socket 11a is provided of the DMD board 11 by the fixing members 14 when the image forming unit 10 is fixed to the lighting bracket 26 (refer to FIG. 6) with screws.

The fixing of the image forming unit 10 to the lighting bracket 26 is described below. First, the image forming unit 10 is positioned to the lighting bracket 26 such that the DMD 12 faces the opening of the irradiation through-hole 26d provided to the lower surface of the lighting bracket 26 of the lighting unit 20, which is illustrated in FIG. 5. Then, screws are inserted in through-holes (not illustrated) provided to the fixing sections 14a and through-holes 15 of the DMD board 11 from below and screwed in tapped holes provided to the lower surfaces of the screw fixing portions 26g (refer to FIG. 3) provided to the lighting bracket 26 so as to fix the image forming unit 10 to the lighting bracket 26. As the screws are screwed in the screw fixing portions 26g provided to the lighting bracket 26, the pushers 14b push the heat sink 13 toward the DMD board 11. As a result, the heat sink 13 is pushed and fixed to the surface opposite the surface on which the socket 11a is provided of the DMD board 11 by the fixing member 14.

In this way, the image forming unit 10 is fixed to the lighting bracket 26 and the three legs 29 illustrated in FIG. 3 also support the weight of the image forming unit 10.

A plurality of moveable micro mirrors are arranged in matrix on the image forming surface of the DMD 12. Each micro mirror can slant a mirror surface thereof at a certain angle around a torsion axis to be set to two states of "ON" and "OFF". When set to the "ON" state, the micro mirror reflects light from the light source 61 toward the first optical system 70 (refer to FIG. 2) as illustrated as an arrow L2 in FIG. 7. When set to the "OFF" state, the micro mirror reflects light from the light source 61 toward the OFF light plate 27 held on the side surface of the lighting bracket 26 illustrated in FIG. 6 (refer to an arrow L1 in FIG. 7). Accordingly, projection of light can be controlled for each pixel of image data by driving each mirror individually, thereby enabling an image to be produced.

Light reflected toward the OFF light plate 27 (not illustrated in FIG. 7) is absorbed as heat and cooled by an outside air flow.

The first optical unit 30 is described below.

Figure 9:
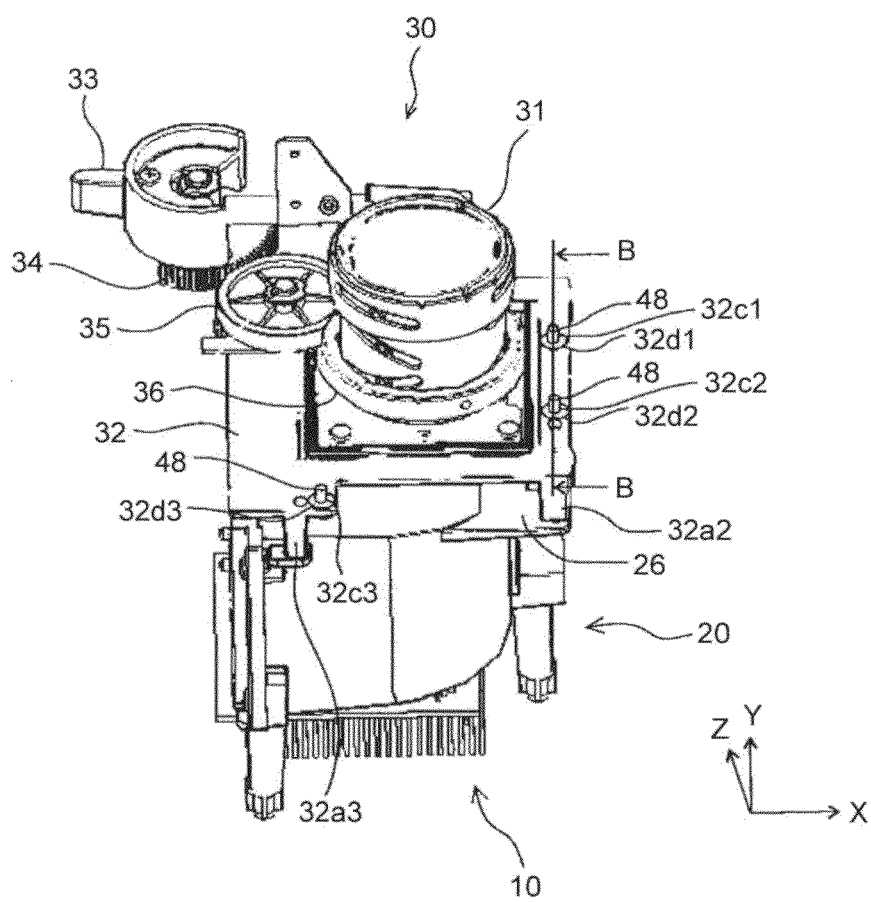
FIG. 9 is a perspective view illustrating a first optical system unit together with the lighting unit and the image forming unit.

FIG. 9 is a perspective view illustrating the first optical unit 30 together with the lighting unit 20 and the image forming unit 10.

As illustrated in FIG. 9, the first optical unit 30 is disposed on the lighting unit 20 and includes the projection lens unit 31 holding the first optical system 70 made up of a plurality of lenses (refer to FIG. 2) and the lens holder 32 holding the projection lens unit 31. The lens holder 32 is provided with four legs 32a1 to 32a4 extending downward (in FIG. 9, only the legs 32a2 and 32a3 are illustrated, and as for the legs 32a1 and 32a4, refer to FIGS. 3 and 4, respectively). Tapped holes are formed on the bottom surfaces of the legs 32a1 to 32a4 and used for fixing the lens holder 32 to the lighting bracket 26 with screws.

The projection lens unit 31 is provided with a focusing gear 36, with which an idler gear 35 engages. A lever gear 34 engages with the idler gear 35. The focusing lever 33 is fixed to the rotational shaft of the lever gear 34. A tip portion of the focusing lever 33 is exposed out of the apparatus body (main body) as illustrated in FIG. 1.

With the movement of the focusing lever 33, the focusing gear 36 is rotated through the lever gear 34 and the idler gear 35. With the rotation of the focusing gear 36, the lenses included in the first optical system 70 in the projection lens unit 31 are moved in respective certain directions, resulting in a focus of a projection image being adjusted.

The lens holder 32 has four screw through-holes 32c1 to 32c4 through which screws 48 used for fixing the second optical unit 40 to the first optical unit 30 are inserted (in FIG. 9, three screw through-holes 32c1 to 32c3 and tip portions of the screws 48 inserted in the screw through-holes are illustrated). Second optical unit positioning projections projected from the surface of the lens holder 32 are formed around the respective screw through-holes 32c1 to 32c4 (in FIG. 9, only second optical unit positioning projections 32d1 to 32d3 are illustrated).

Figure 10:
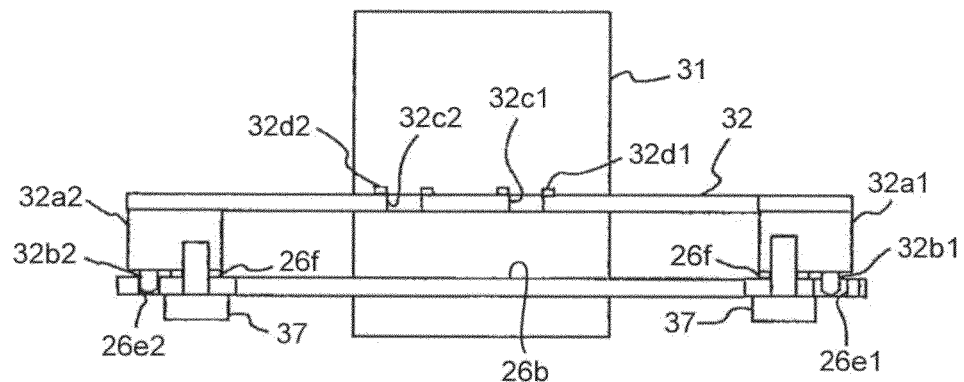
FIG. 10 is a sectional view along line B-B of FIG. 9.
Figure 10:
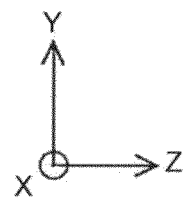

FIG. 10 is a sectional view along line B-B of FIG. 9.

As illustrated in FIG. 10, the legs 32a1 and 32a2 are provided with positioning receiving projections 32b1 and 32b2, respectively. The positioning receiving projection 32b1 on the right side in FIG. 10 is inserted in the positioning hole 26e1 that is formed as a round hole on the upper surface 26b of the lighting bracket 26 and serves as the primary reference for the positioning, resulting in the lens holder 32 being positioned in the Z-axis direction. The positioning receiving projection 32b2 on the left side in FIG. 10 is inserted in the positioning hole 26e2 that is formed as an elongate hole on the upper surface 26b of the lighting bracket 26 and serves as the secondary reference for the positioning, resulting in the lens holder 32 being positioned in the X-axis direction. Thereafter, screws 37 are inserted in the through-holes 26c1 to 26c4 provided on the upper surface 26b of the lighting bracket 26 and screwed in the tapped holes provided to the legs 32a1 to 32a4 of the lens holder 32, resulting in the first optical unit 30 being fixed to the lighting unit 20.

An upper portion of the projection lens unit 31 with regard to the lens holder 32 is covered by a mirror holder 45 (refer to FIG. 12) of the second optical unit 40, which is described later. As illustrated in FIG. 10, the projection lens unit 31 is exposed between the lower surface of lens holder 32 and the upper surface 26b of the lighting bracket 26 of the lighting unit 20. However, no light enters an optical path of an image from the exposed portion because the projection lens unit 31 is fitted in the lens holder 32.

The second optical unit 40 is described below.

Figure 11:
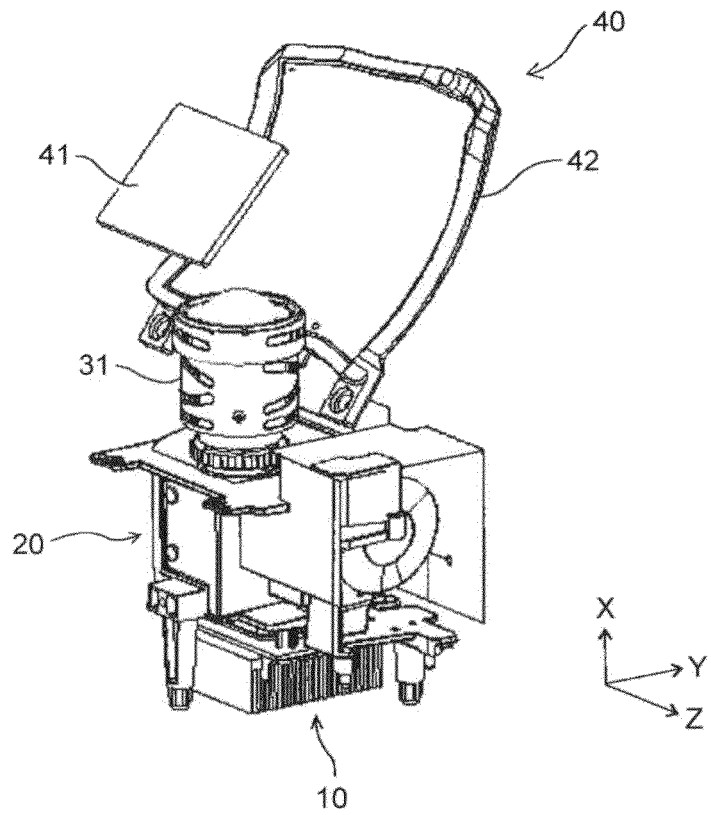
FIG. 11 is a perspective view illustrating a second optical system held by a second optical system unit together with the projection lens unit, the lighting unit, and the image forming unit.

FIG. 11 is a perspective view illustrating a second optical system included in the second optical unit 40, the projection lens unit 31, the lighting unit 20, and the image forming unit 10.

As illustrated in FIG. 11, the second optical unit 40 includes the reflection mirror 41 and the curved mirror 42 having a concave shape that constitute the second optical system. A light-reflecting surface of the curved mirror 42 may be formed in a spherical surface, a rotationally symmetric aspheric surface, or a free-form surface, for example.

Figure 12:
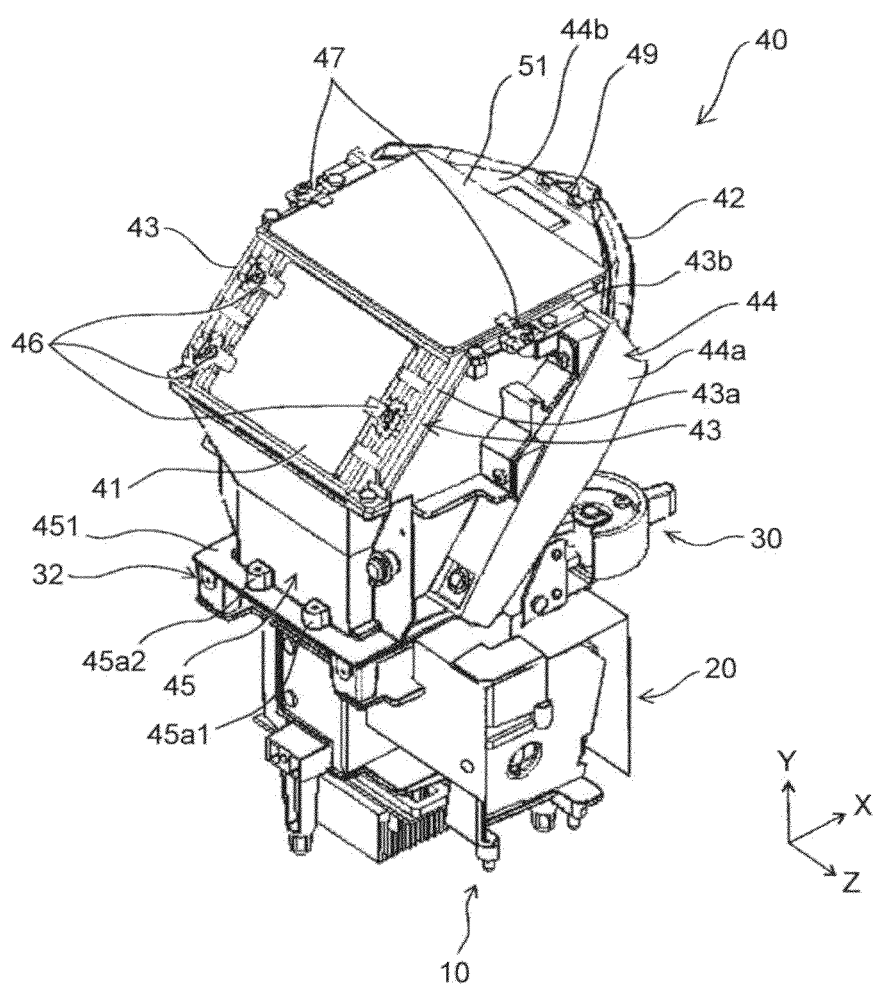
FIG. 12 is a perspective view illustrating the second optical system unit together with the first optical system unit, the lighting unit, and the image forming unit.

FIG. 12 is a perspective view illustrating the second optical unit 40 together with the first optical unit 30, the lighting unit 20, and the image forming unit 10.

As illustrated in FIG. 12, the second optical unit 40 also includes the transmissive glass 51 through which an optical image reflected from the curved mirror 42 passes and that protects the optical parts in the apparatus from dust.

The second optical unit 40 includes a mirror bracket 43 holding the reflection mirror 41 and the transmissive glass 51, a free mirror bracket 44 holding the curved mirror 42, and the mirror holder 45 to which the mirror bracket 43 and the free mirror bracket 44 are attached.

The mirror holder 45 has a boxy shape and areas corresponding to the upper surface, the lower surface, and a surface on the far side in the X direction in FIG. 12 are open. That is, the mirror holder 45 has approximately a c-shape from top view. Edge sections located on the near side and the far side in the Z direction of the upper opening of the mirror holder 45 extend in the X direction, and each edge section has a slanted section and a parallel section. The slanted section ascends as it extends from an edge on the near side to the far side in the X direction while the parallel section extends in parallel with the X direction. The slanted section is located on the near side in the X direction with regard to the parallel section. The other edge section located on the near side in the X direction of the upper opening of the mirror holder 45 extends in the Z direction in parallel with the Z direction.

The mirror bracket 43 is mounted on the mirror holder 45. The mirror bracket 43 has a slanted surface 43a and a parallel surface 43b. The slanted surface 43a abuts the slanted sections of the edge sections of the upper opening of the mirror holder 45 and ascends as it extends from the edge on the nearside to the far side in the X direction. The parallel surface 43b abuts the parallel sections of the edge sections of the upper opening of the mirror holder 45 and is in parallel with the X direction. Each of the slanted surface 43a and the parallel surface 43b has an opening. The reflection mirror 41 is held so as to cover the opening of the slanted surface 43a while the transmissive glass 51 is held so as to cover the opening of the parallel surface 43b.

The reflection mirror 41 is positioned to and held by the slanted surface 43a of the mirror bracket 43 with mirror pushing members 46 having a plate spring shape that push both ends of the reflection mirror 41 in the Z direction to the slanted surface 43a of the mirror bracket 43. One end of the reflection mirror 41 in the Z direction is fixed by the two mirror pushing members 46 and the other end of the reflection mirror 41 in the Z direction is fixed by one mirror pushing member 46.

The transmissive glass 51 is positioned and fixed to the mirror bracket 43 with glass pushing members 47 having a plate spring shape that push both ends of the transmissive glass 51 in the Z direction to the parallel surface 43b of the mirror bracket 43. The transmissive glass 51 is held by the glass pushing member 47 at each end in the Z direction.

The free mirror bracket 44 holding the curved mirror 42 has arms 44a on the near side and the far side in the Z-axis direction. The arm 44a descends as it extends from the far side to the near side in the X direction in FIG. 12.

The free mirror bracket 44 has a connector 44b that connects the two arms 44a at the upper portions of the arms 44a. The arms 44a of the free mirror bracket 44 are attached to the mirror holder 45 such that the curved mirror 42 covers the opening of the mirror holder 45 on the far side in the X direction.

The curved mirror 42 is pushed to the connector 44b of the free mirror bracket 44 by a free mirror pushing member 49 having a plate spring shape at approximately a central portion of the edge thereof on the transmissive glass 51 side. Both ends of the curved mirror 42 on the first optical system 70 side in the Z-axis direction are fixed to the arms 44a of the free mirror bracket 44 with screws.

The second optical unit 40 is mounted on and fixed to the lens holder 32 of the first optical unit 30. Specifically, the mirror holder 45 has at the lower end thereof a lower surface 451 facing the upper surface of the lens holder 32. The lower surface 451 is provided with four screw fixing portions having a tubular shape used for fixing the mirror holder 45 to the first optical unit 30 with screws (in the four screw fixing portions, as for screw fixing portions 45a1 and 45a2, refer to FIG. 11, as for the screw fixing portion 45a3, refer to FIG. 5, and the other screw fixing portion is not illustrated). The screws 48 (refer to FIG. 9) are inserted in the respective screw throughholes 32c1 to 32c3 provided to the lens holder 32 of the first optical unit 30 and screwed to the respective screw fixing portions 45a1 to 45a3, resulting in the second optical unit 40 being fixed to the first optical unit 30 with the screws 48. Meanwhile, the lower surface 451 of the mirror holder 45 of the second optical unit 40 abuts the second optical unit positioning projections 32d1 to 32d4, resulting in the second optical unit 40 being positioned and fixed in the Y direction.

As the result of the mounting and fixing of the second optical unit 40 to the lens holder 32 of the first optical unit 30, the upper portion of the projection lens unit 31 with regard to the lens holder 32 is housed in the mirror holder 45 of the second optical unit 40 as illustrated in FIG. 9. When the second optical unit 40 is mounted on and fixed to the lens holder 32, a gap is formed between the curved mirror 42 and the lens holder 32, and the idler gear 35 (refer to FIG. 9) is disposed in the gap.

Figure 13:
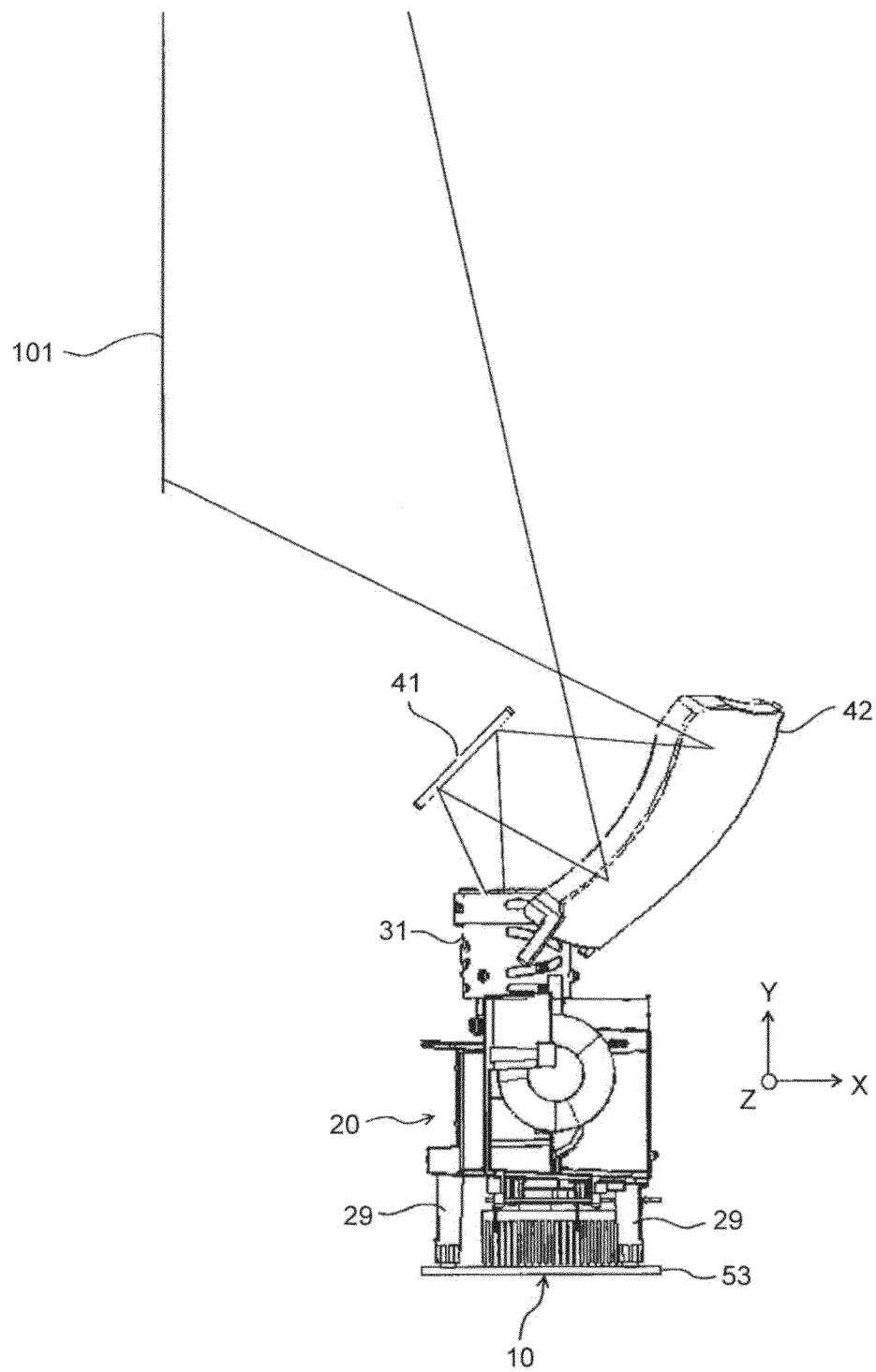
FIG. 13 is a perspective view illustrating an optical path from the first optical system to the projection plane.

FIG. 13 is a perspective view illustrating an optical path from the first optical system 70 to the projection plane 101 (screen).

A light beam after passing through the projection lens unit 31 included in the first optical system 70 forms a conjugate intermediate image to an image produced by the DMD 12 between the reflection mirror 41 and the curved mirror 42. The intermediate image is focused as a curved image between the reflection mirror 41 and the curved mirror 42. The light beam dispersed after focusing of the intermediate image, enters the curved mirror 42 having a concave shape and becomes a convergent light beam. The intermediate image is changed to a "further enlarged image", projected, and focused on the projection plane 101 by the curved mirror 42.

As described above, a projection optical system is made up of the first optical system 70 and the second optical system, and the intermediate image is formed between the first optical system 70 and the curved mirror 42 of the second optical system, and enlarged and projected by the curved mirror 42. As a result, a projection distance can be shortened, thereby enabling the projector 1 to be used in a small meeting room, for example.

As illustrated in FIG. 13, the first optical unit 30 and the second optical unit 40 are mounted on and fixed to the lighting bracket 26. The image forming unit 10 is also fixed to the lighting bracket 26. As a result, the legs 29 of the lighting bracket 26 receive the weights of the first optical unit 30, the second optical unit 40, and the image forming unit 10 and are fixed to the base member 53.

Figure 14:
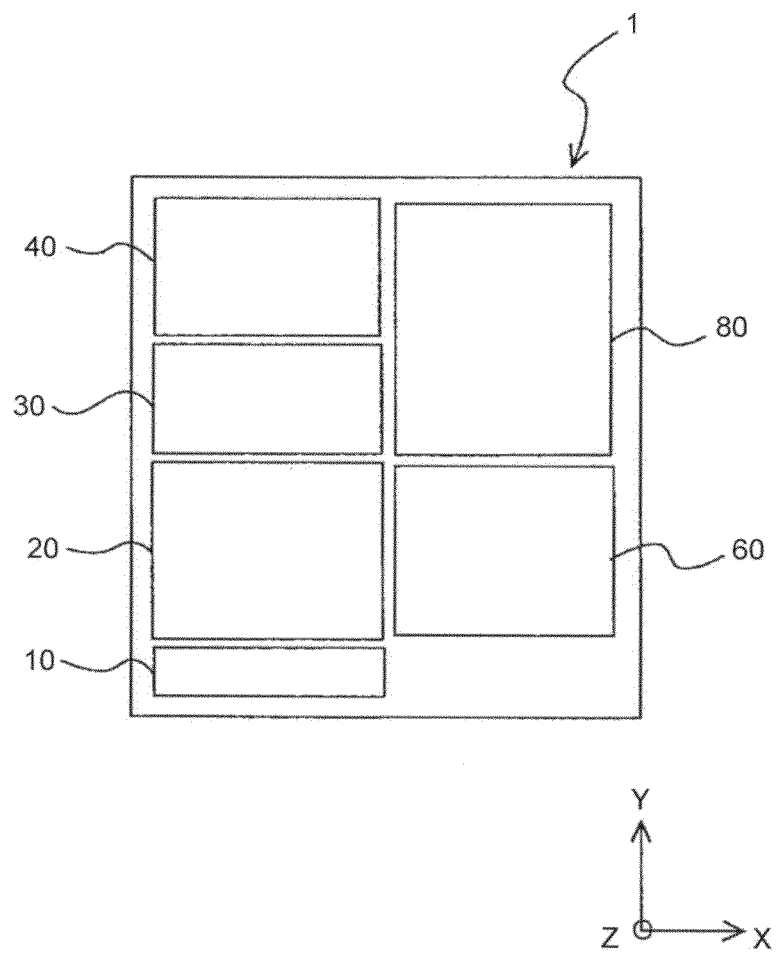
FIG. 14 is a schematic diagram illustrating an arrangement of the units in the projector.

FIG. 14 is a schematic diagram illustrating an arrangement of the units in the apparatus.

As illustrated in FIG. 14, the image forming unit 10, the lighting unit 20, the first optical unit 30, and the second optical unit 40 are arranged in a layered manner in the Y direction, which is the short-axis direction of the projection plane 101, while the light source unit 60 is disposed in the Z direction, which is the long-axis direction of the projection plane 101, relative to the layered body in which the image forming unit 10, the lighting unit 20, the first optical unit 30, and the second optical unit 40 are arranged in a layered manner. In the embodiment, the image forming unit 10, the lighting unit 20, the first optical unit 30, the second optical unit 40, and the light source unit 60 are disposed in the Y direction or the Z direction that is the direction in parallel with a projection image and the projection plane 101 as described above. More specifically, the light source unit 60 is connected to the image forming section 100A made up of the image forming unit 10 and the lighting unit 20 in a direction orthogonal to a direction in which the image forming section 100A and the projection optical section 100B made up of the first optical unit 30 and the second optical unit 40 are arranged in a layered manner. The image forming section 100A and the light source unit 60 are arranged on a straight line parallel to the base member 53. The image forming section 100A and the projection optical section 100B are arranged in this order from the base member 53 on a straight line perpendicular to the base member 53. As a result, an installation space of the apparatus can be suppressed from being taken in a direction orthogonal to a plane of a projection image projected on the projection plane 101. Consequently, when the image projection apparatus is used while placed on a desk, for example, the apparatus can be prevented from hindering the arrangement of the desk and chairs in a small room.

In the embodiment, the power source unit 80 supplying power to the light source 61 and the DMD 12 is disposed above the light source unit 60 in a layered manner. The light source unit 60, the power source unit 80, the image forming section 100A, and the projection optical section 100B are housed in a housing of the projector 1. The housing includes the upper surface of the projector 1, the base member 53, and an outer packaging cover 59 (refer to FIGS. 18 and 19) covering around the projector 1, which is described later.

Figure 15:
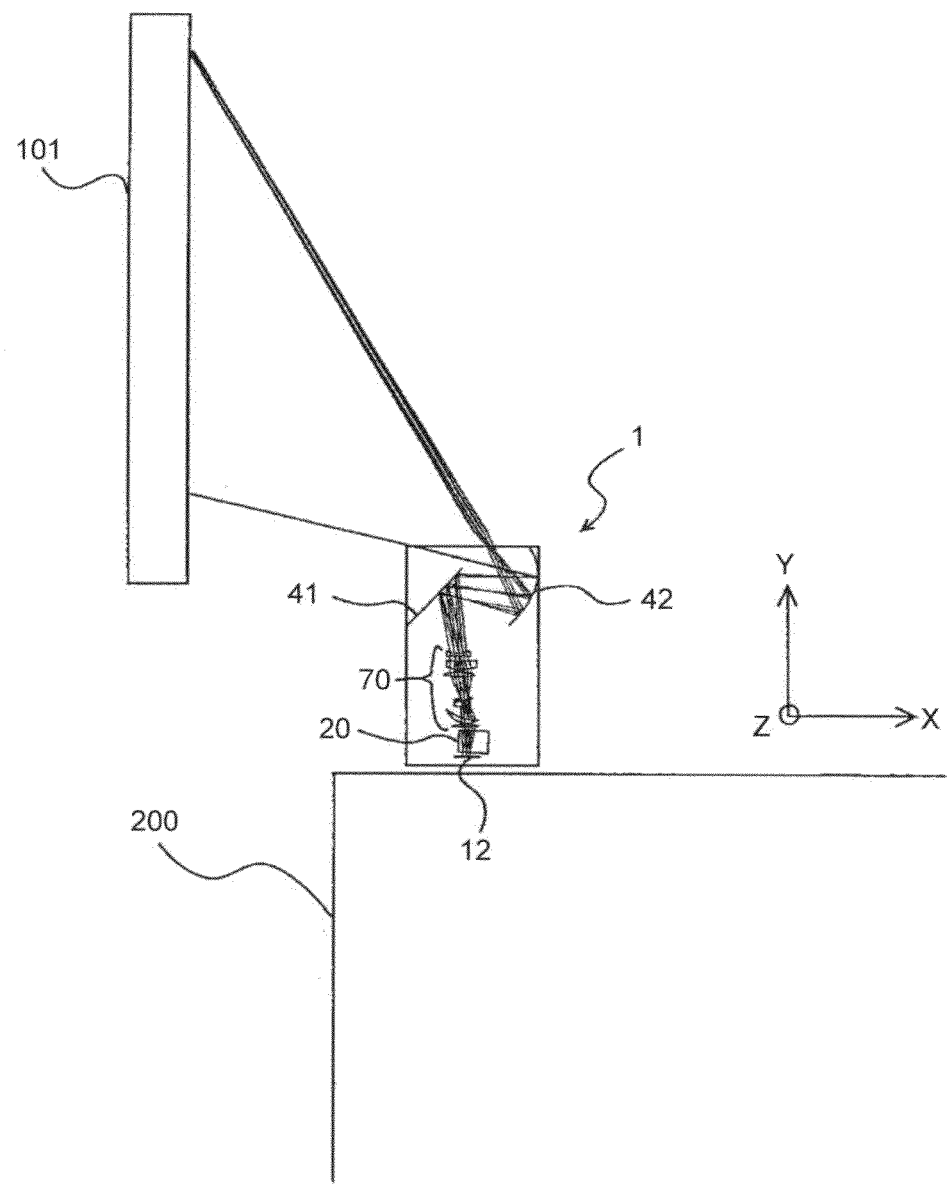
FIG. 15 is a schematic diagram illustrating an example of use of the projector in the embodiment.
Figure 16:
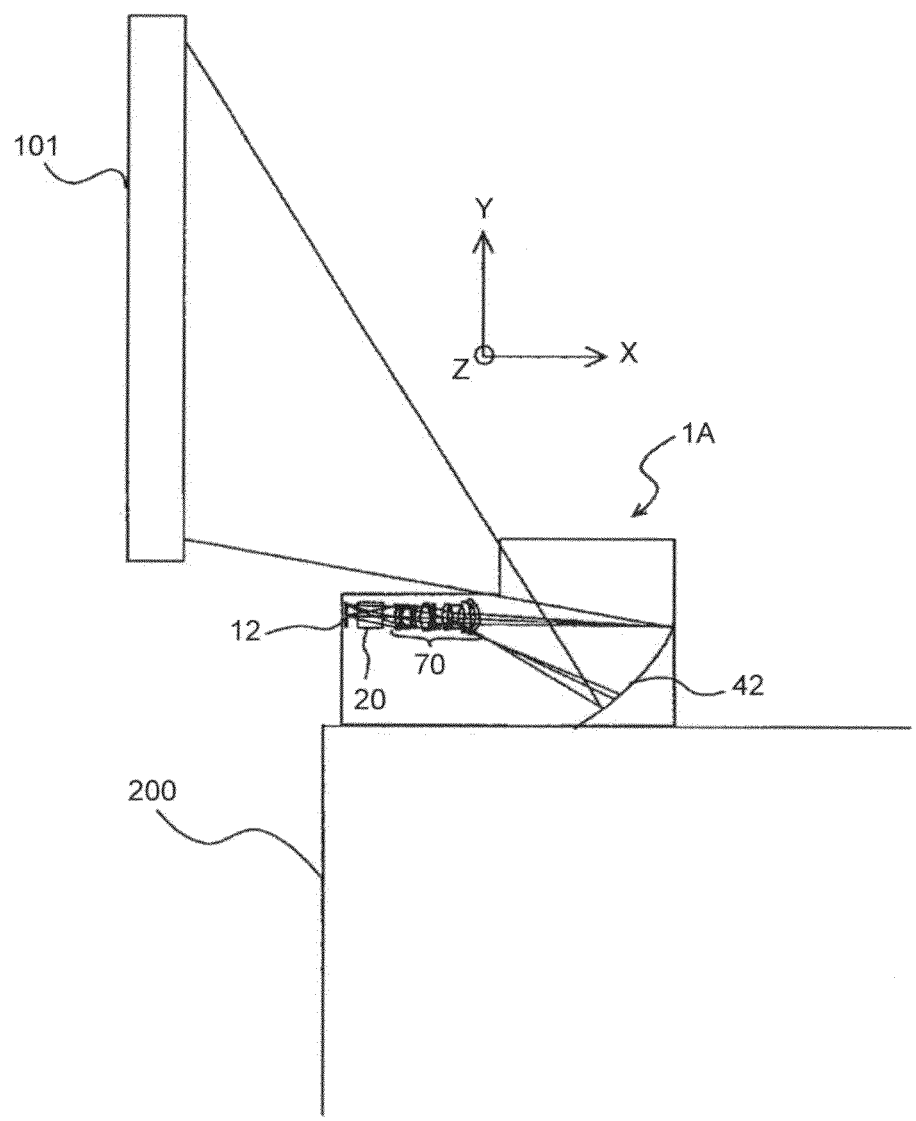
FIG. 16 is a schematic diagram illustrating an example of use of a conventional projector.
Figure 17:
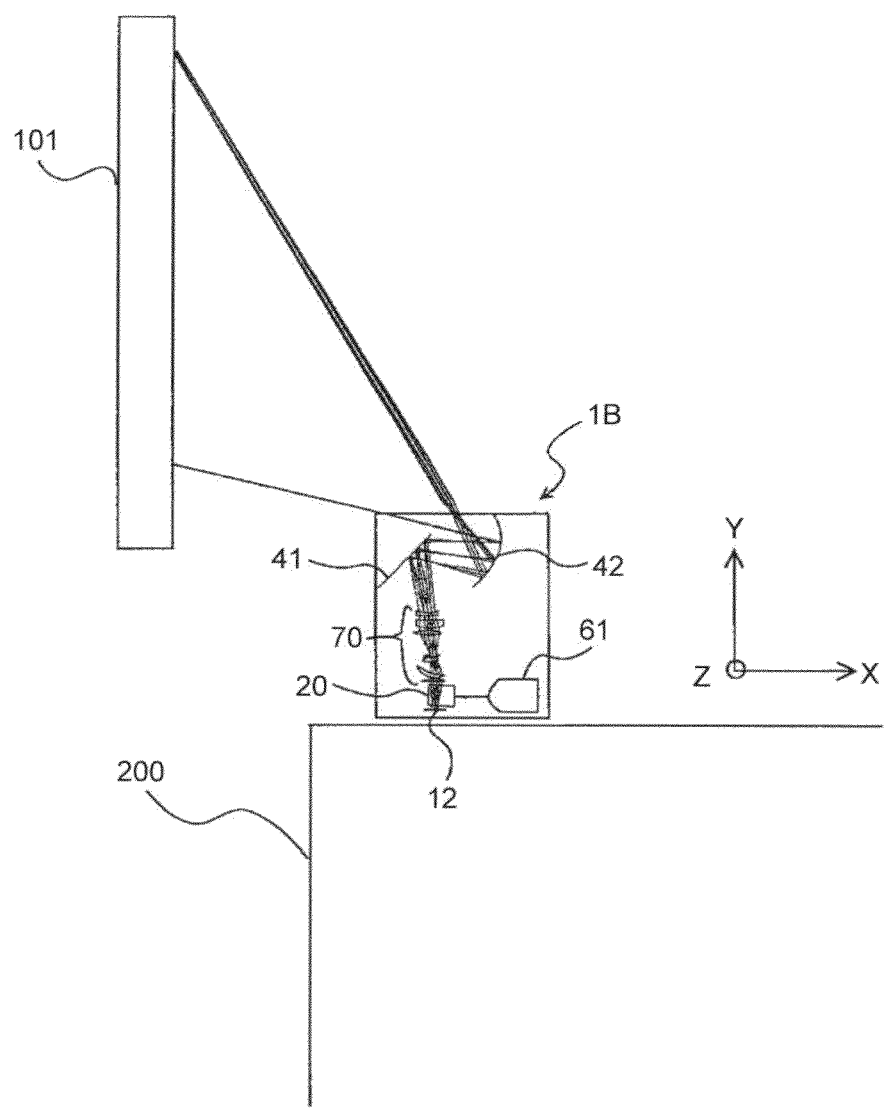
FIG. 17 is a schematic diagram illustrating an example of use of a projector in which a light source and the lighting unit are arranged in a direction orthogonal to the projection plane.

FIG. 15 is a schematic diagram illustrating an example of use of the projector 1 of the embodiment. FIG. 16 is a schematic diagram illustrating an example of use of a conventional projector 1A. FIG. 17 is a schematic diagram illustrating an example of use of a projector 1B in which the light source unit 60 and the lighting unit 20 are arranged in a direction orthogonal to the projection plane 101.

As illustrated in FIGS. 15 to 17, each of the projectors 1, 1A, and 1B is placed on a table 200 and used for projecting an image on the projection plane 101 such as a whiteboard when used in a meeting room, for example.

As illustrated in FIG. 16, in the conventional projector 1A, the DMD 12 (image forming element), the lighting unit 20, the first optical system 70, and the second optical system (the curved mirror 42) are arranged in series in a direction orthogonal to the plane of a projection image projected on the projection plane 101. As a result, the projector 1A is long in the direction orthogonal to the projection plane 101 (the X direction) and takes space in the direction orthogonal to the projection plane 101. In general, chairs on which viewers who watch images projected on the projection plane 101 sit and desks used by the viewers are arranged in the direction orthogonal to the projection plane 101. Therefore, when the projector takes space in the direction orthogonal to the projection plane, a space for arranging the chairs and the desks is limited due to the space taken by the projector, thereby lowering convenience.

In the projector 1B illustrated in FIG. 17, the DMD 12 (image forming element), the lighting unit 20, and the first optical system 70 are arranged in series in a direction parallel to the plane of a projection image projected on the projection plane 101. Accordingly, the length of the projector 1B in the direction orthogonal to the projection plane 101 can be shortened with regard to that of the projector 1A illustrated in FIG. 16. The projector 1B illustrated in FIG. 17, however, cannot sufficiently shorten the length thereof in the direction orthogonal to the projection plane 101 because the light source 61 is disposed in the direction orthogonal to the projection plane 101 relative to the lighting unit 20.

In contrast, in the projector 1 of the embodiment illustrated in FIG. 15, the image forming section 100A made up of the image forming unit 10 and the lighting unit 20 and the projection optical section 100B made up of the first optical unit 30 and the reflection mirror 41 are arranged in series in the Y direction, which is one of the directions parallel to the projection plane 101 and the image plane of a projection image projected on the projection plane 101. In addition, the light source unit 60 and the lighting unit 20 are arranged in series in the Z direction, which is one of the directions parallel to the plane of a projection image projected on the projection plane 101. That is, in the projector 1 of the embodiment, the light source unit 60, the image forming unit 10, the lighting unit 20, the first optical unit 30, and the reflection mirror 41 are arranged in the direction parallel to the plane of a projection image projected on the projection plane 101 (the Z direction or the Y direction), and each of the light source unit 60, the image forming unit 10, the lighting unit 20, the first optical unit 30, and the reflection mirror 41 is disposed in parallel with the projection plane 101 and the image plane of a projection image. Because the light source unit 60, the image forming unit 10, the lighting unit 20, the first optical unit 30, and the reflection mirror 41 are arranged in the direction parallel to the plane of a projection image projected on the projection plane 101 (the Z direction or the Y direction) as described above, the length of the projector 1 in the direction orthogonal to the projection plane 101 (the X direction) can be shortened with regard to those of the projectors illustrated in FIGS. 16 and 17. As a result, the projector 1 can be prevented from causing a space for arranging chairs and desks to be reduced, thereby enabling the projector 1 to provide higher convenience.

In the embodiment, as illustrated in FIG. 14, the power source unit 80 supplying power to the light source 61 and the DMD 12 is disposed above the light source unit 60 in a layered manner. As a result, the length in the Z direction of the projector 1 is also reduced.

Although the second optical system includes the reflection mirror 41 and the curved mirror 42 in the embodiment, the second optical system may include only the curved mirror 42. The reflection mirror 41 may be a planar mirror, a mirror having positive refractive power, or a mirror having negative refractive power. Although the concave mirror is used as the curved mirror 42 in the embodiment, a convex mirror can be used as the curved mirror 42. In this case, the first optical system 70 is structured such that no intermediate image is formed between the first optical system 70 and the curved mirror 42.

The light source 61 needs to be periodically replaced with a new one because its life span ends after being used for a certain period of time. Therefore, the light source unit 60 is attached to the apparatus body in a detachable manner in the embodiment.

Figure 18:
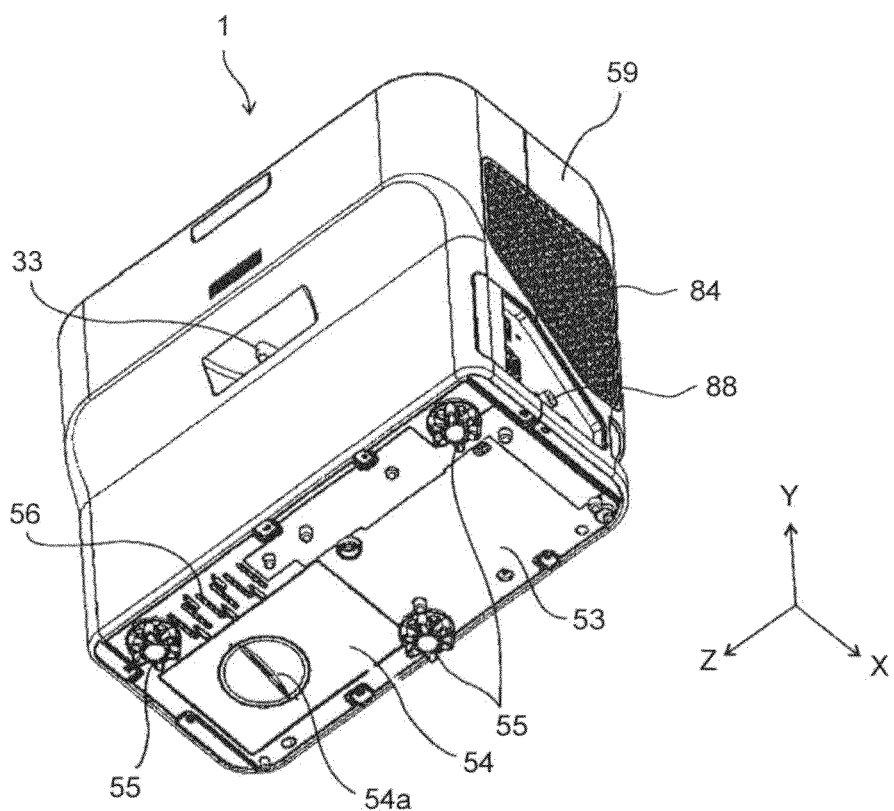
FIG. 18 is a perspective view illustrating a placement surface side of the projector.

FIG. 18 is a perspective view illustrating a placement surface side of the projector 1.

As illustrated in FIG. 18, the base member 53 included in the bottom surface of the projector 1 is provided with the open-close cover 54, which is provided with a rotational operating unit 54a. When the rotational operating unit 54a is rotated, fixing between the open-close cover 54 and the apparatus body is released and the open-close cover 54 can be removed from the apparatus body. The base member 53 is provided with a power source air intake port 56 at a position adjacent to the open-close cover 54 in the X direction.

As illustrated in FIG. 18, an air intake port 84 and an external input unit 88 to which image data is input from an external apparatus such as a personal computer are provided to one Y-X plane of the outer packaging cover 59 of the projector 1.

Figure 19:
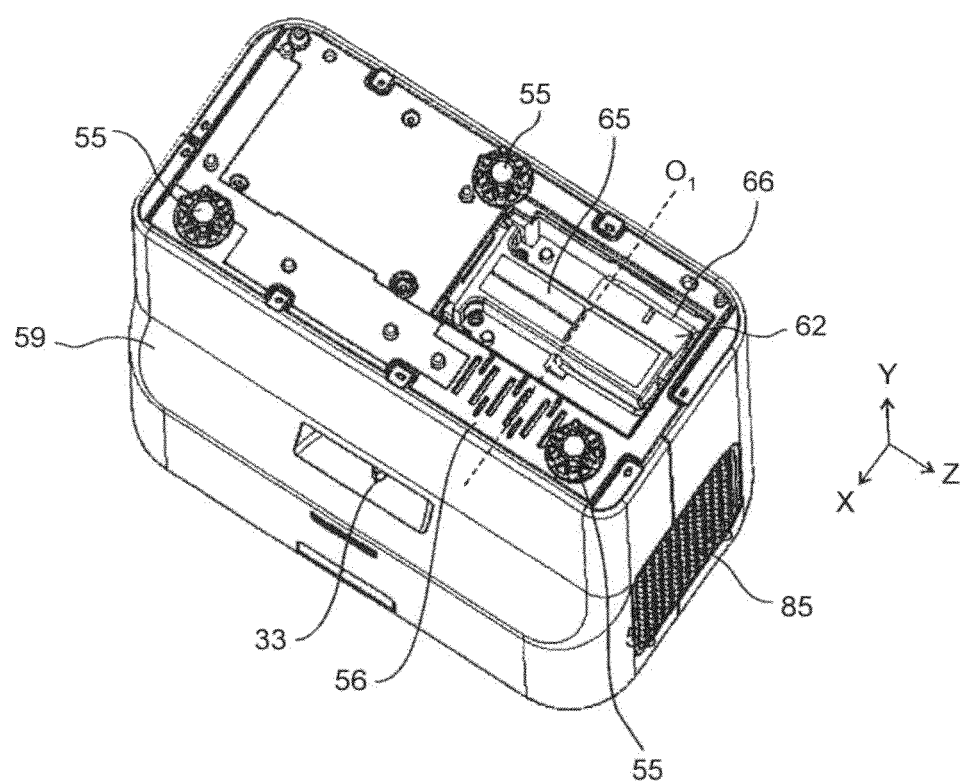
FIG. 19 is a perspective view illustrating the placement surface side of the projector when an open-close cover is removed from the projector.

FIG. 19 is a perspective view illustrating the placement surface side of the projector 1 when the open-close cover 54 is removed from the apparatus.

As illustrated in FIG. 19, a surface opposite the side to which the light source 61 is attached of the light source bracket 62 of the light source unit 60 is exposed when the open-close cover 54 is removed. A handgrip 66 is attached to the light source bracket 62 so as to be rotatable to the light source bracket 62 around $O_1$ indicated with the dashed line in FIG. 19 as a rotational center.

To remove the light source unit 60 from the apparatus body, the light source unit 60 is removed through an opening of the apparatus body by rotating the handgrip 66 to grip the handgrip 66, and pulling the handgrip 66 to the near side in FIG. 19. When the light source unit 60 is attached to the apparatus body, the light source unit 60 is inserted in the opening of the apparatus body. The light source unit 60 inserted in the apparatus body is connected to a power source side connector (not illustrated) of the apparatus body with the connector 62a illustrated in FIG. 4. The light source positioning portions 64a1 to 64a3 of the holder 64 illustrated in FIG. 4 are fitted in the light source positioning receiving portions 26a1 to 26a3 provided to the lighting bracket 26 of the lighting unit 20 illustrated in FIG. 6, resulting in the light source unit 60 being positioned to the apparatus body. As a result, the attachment of the light source unit 60 is completed. Then, the open-close cover 54 is attached to the base member 53. Although the handgrip 66 is provided to the light source unit 60 in the embodiment, the passage 65 that protrudes on the open-close cover 54 side as illustrated in FIG. 19 may be used as the handgrip.

The base member 53 is provided with three legs 55. A projecting amount from the base member 53 is changed by rotating the legs 55, thereby enabling an adjustment in a height direction (the Y direction).

As illustrated in FIG. 19, an exhaust port 85 is provided to the other Y-X plane of the outer packaging cover 59.

Figure 20:
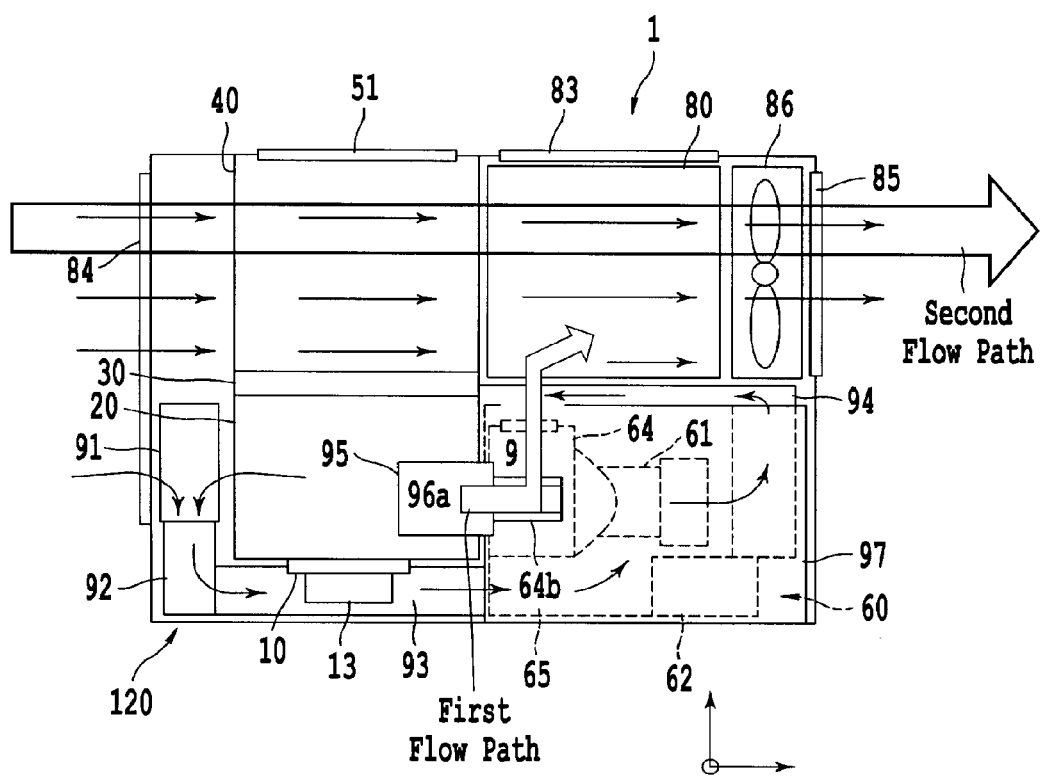
FIG. 20 is a schematic diagram to explain an air flow in the projector.
Figure 21:
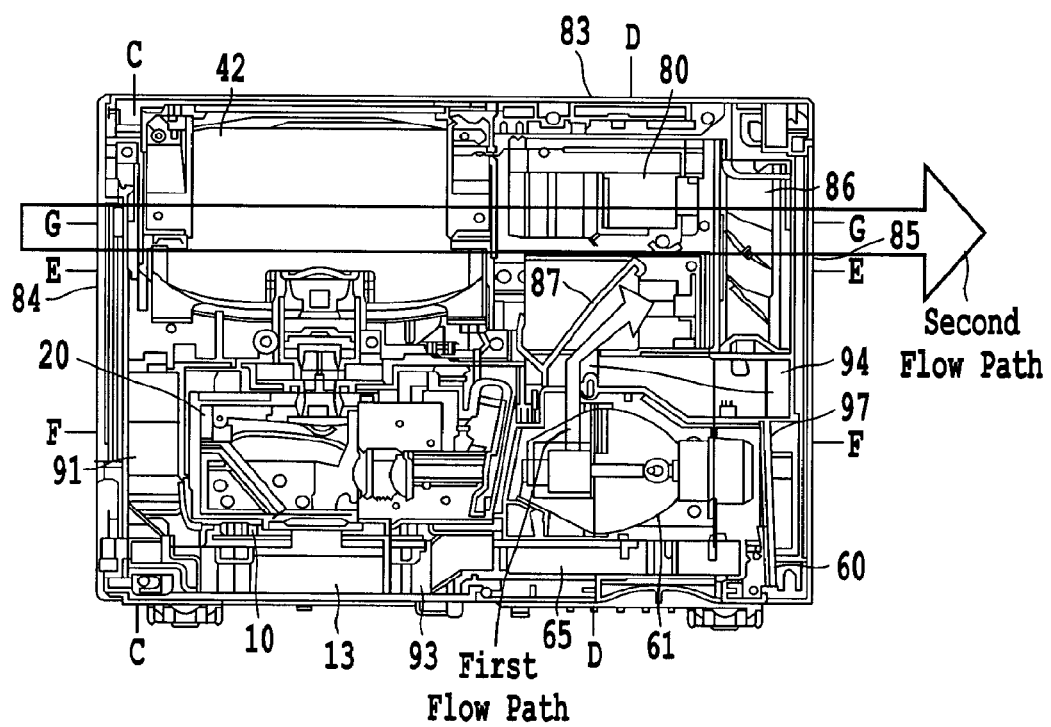
FIG. 21 is a schematic diagram more specifically illustrating the structure illustrated in FIG. 20.
Figure 22:
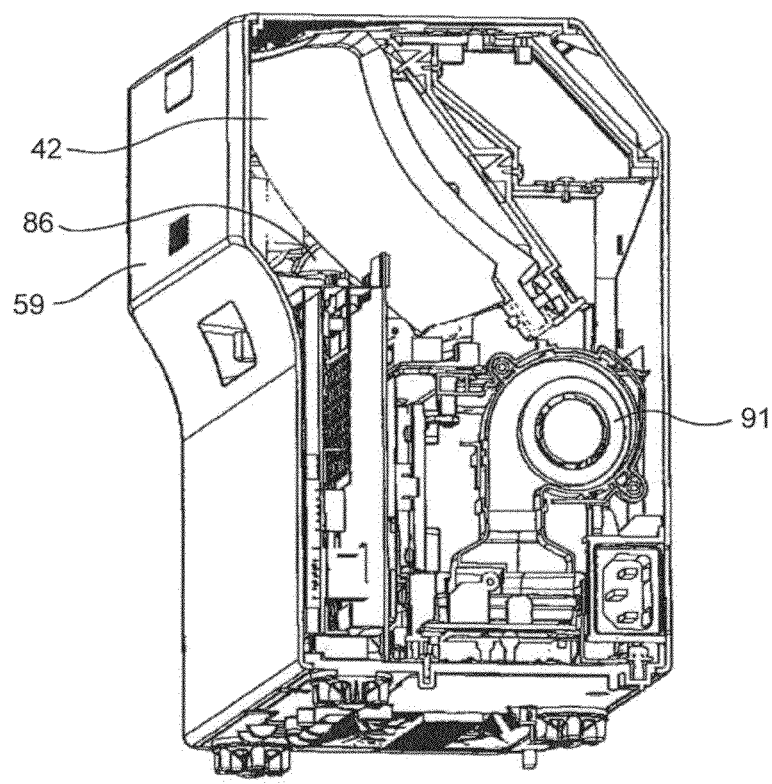
FIG. 22 is a sectional view along line C-C of FIG. 21.
Figure 23:
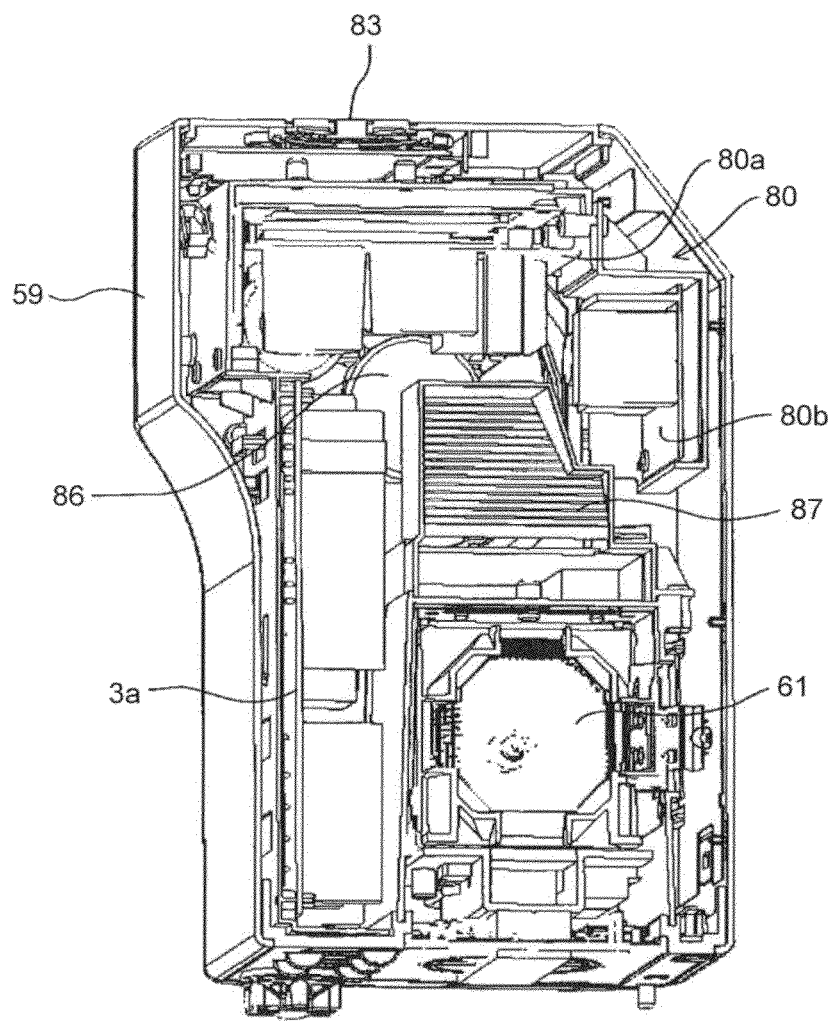
FIG. 23 is a sectional view along line D-D of FIG. 21.
Figure 24:
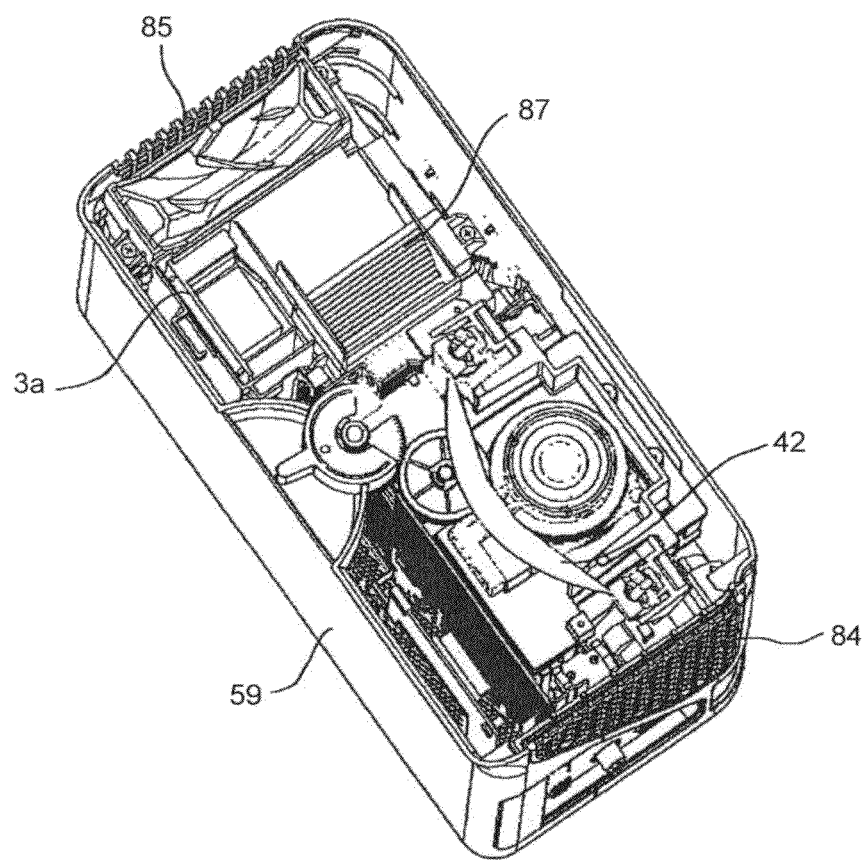
FIG. 24 is a sectional view along line E-E of FIG. 21.
Figure 25:
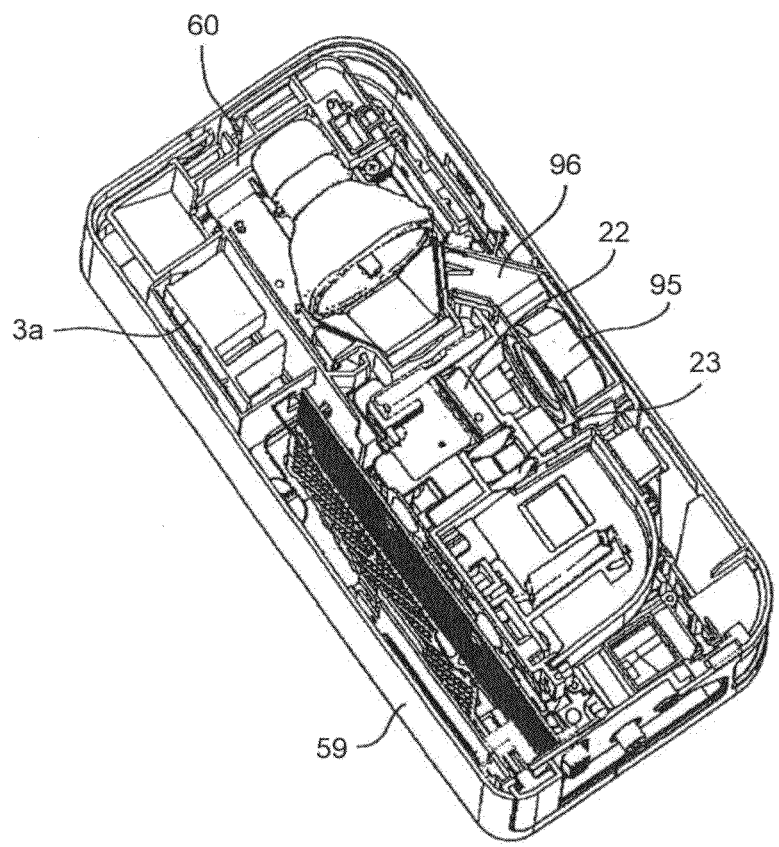
FIG. 25 is a sectional view along line F-F of FIG. 21.
Figure 26:
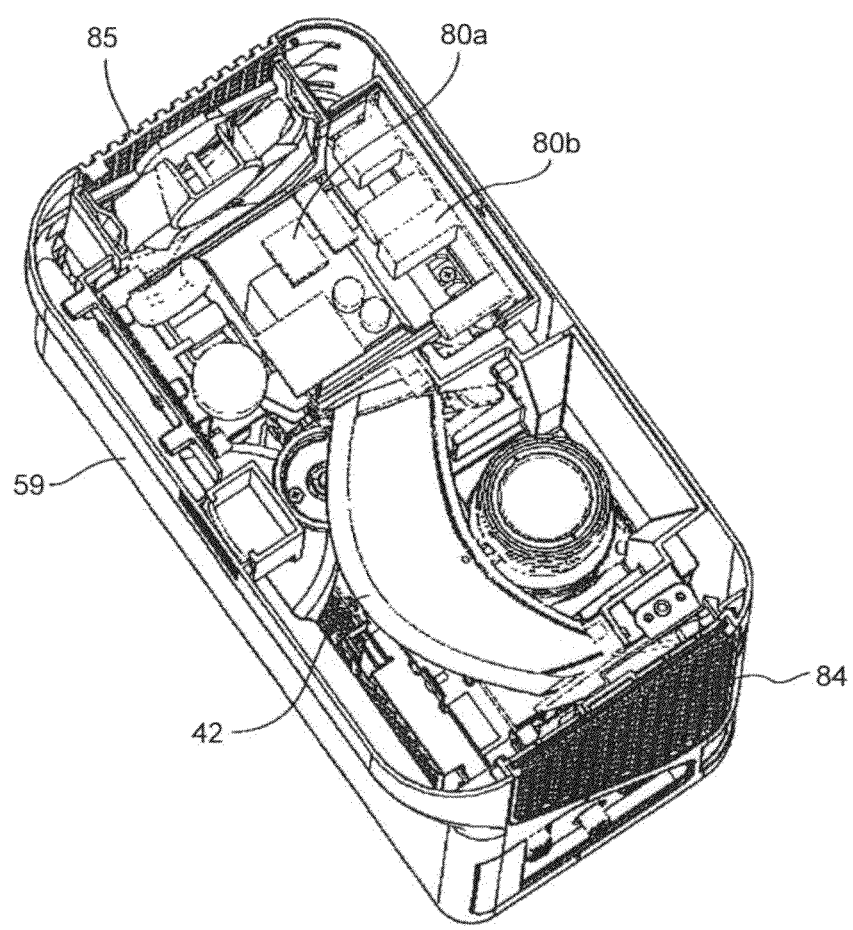
FIG. 26 is a sectional view along line G-G of FIG. 21.

FIG. 20 is a schematic diagram to explain an air flow in the projector 1 of the embodiment. FIG. 20 illustrates the projector 1 viewed from the direction orthogonal to the projection plane 101 (the X direction). FIG. 21 illustrates the components in the embodiment corresponding to the numerals in FIG. 20 with the same numerals. In FIGS. 20 and 21, the arrows indicate air flow directions. FIG. 22 is a sectional view along line C-C of FIG. 21. FIG. 23 is a sectional view along line D-D of FIG. 21. FIG. 24 is a sectional view along line E-E of FIG. 21. FIG. 25 is a sectional view along line F-F of FIG. 21. FIG. 26 is a sectional view along line G-G of FIG. 21.

As illustrated in FIG. 20, the air intake port 84 that takes ambient air into the inside of the projector 1 is provided to one side surface (the left side in FIG. 20) of the projector 1 while the exhaust port 85 that discharges air inside the projector 1 is provided to the other side surface (the right side in FIG. 20) of the projector 1. An exhaust fan 86 is provided so as to face the exhaust port 85.

Parts of the exhaust port 85 and the air intake port 84 are provided so as to be between the light source unit 60 and the operating unit 83 when the projector 1 is viewed from the direction orthogonal to the projection plane 101 (the X direction). As a result, ambient air taken in from the air intake port 84 flows in the Z-Y plane of the mirror holder 45 and the rear surface of the curved mirror 42 in the second optical unit 40 illustrated in FIG. 12 and toward the air intake port 84 along the mirror holder 45 and a curved surface of the rear surface of the curved mirror 42 (refer to FIGS. 22, 24, and 26). The power source unit 80 disposed above the light source unit 60 has an arch-like shape when viewed from the Z direction. Air flowing from the air intake port 84 along the mirror holder 45 and the curved surface of the rear surface of the curved mirror 42 flows in a space surrounded by the power source unit 80, and is discharged from the exhaust port 85. The curved mirror 42 has a concave shape and the positive power as described above. The rear surface of the curved mirror 42 has a convex shape approximately conforming to the shape of the front surface of the curved mirror 42. The exhaust port 85, the air intake port 84, and the curved mirror 42 are arranged on a straight line.

The arrangement of the exhaust port 85 and part of the air intake port 84 provided so as to be between the light source unit 60 and the operating unit 83 when the projector 1 is viewed from the direction orthogonal to the projection plane 101 (the X direction) enables an air flow to be produced that passes through the space between the light source unit 60 and the operating unit 83 and is discharged from the exhaust port 85. In addition, a space in which air can flow is provided between the curved mirror 42 and the outer packaging cover 59 (refer to FIGS. 22, 24, and 26) and ambient air taken in from the air intake port 84 flows along the rear surface of the curved mirror 42, i.e., the curved surface of the surface that is not used as a reflection surface, and reaches the exhaust port 85. This structure has a cooling effect on the curved mirror 42 and also achieves a flow path having a very low loss in flow rate.

A light source blower 95 is disposed at such a position that the light source blower 95 can take in air surrounding the color motor 21a (refer to FIG. 5) rotating the color wheel 21 of the lighting unit 20 (refer to FIG. 25). As a result, an air flow produced by air sucked in by the light source blower 95 can cool the color motor 21a.

Air taken in by the light source blower 95 flows through a light source duct 96 and flows in the light source air intake port 64b of the holder 64 (refer to FIG. 4). Part of air having flowed in the light source duct 96 flows through an opening 96a formed on a surface facing the outer packaging cover 59 (refer to FIG. 19) of the light source duct 96 through the space between a light source housing 97 and the outer packaging cover 59.

Air flowing in the space between the light source housing 97 and the outer packaging cover 59 through the opening 96a of the light source duct 96 cools the light source housing 97 and the outer packaging cover 59, and thereafter is discharged from the exhaust port 85 by the exhaust fan 86.

Air flowing in the light source air intake port 64b flows in the light source 61, cools the light source 61, and thereafter is discharged from the light source air exhaust port 64c provided on the upper surface of the holder 64. Air discharged from the light source air exhaust port 64c flows through an opening on the upper surface of the light source housing 97 toward the exhaust port 85 along a fluid guide 87. Thereafter, the air mixes with low temperature air flowing in the space surrounded by the power source unit 80 after flowing through the second optical unit 40, and is then discharged from the exhaust port 85 by the exhaust fan 86. In this way, high temperature air discharged from the light source air exhaust port 64c mixes with ambient air before being discharged, thereby enabling air discharged from the exhaust port 85 to be prevented from reaching high temperature. The fluid guide 87 is not always required. Without the fluid guide 87, high temperature air discharged from the light source air exhaust port 64c is discharged from the exhaust port 85 by air flowing toward the exhaust port 85 from the air intake port 84 through the rear surface of the curved mirror 42, in a space surrounded by a main PFC power source board 80a and a sub PFC power source board 80b, which are described later. However, the use of the fluid guide 87 can prevent high temperature air discharged from the light source air exhaust port 64c from flowing directly to the main PFC power source board 80a and flowing in the vicinity of the sub PFC power source board 80b. However, when the fluid guide 87 is used for flowing all high temperature air off the main PFC power source board 80a and the sub PFC power source board 80b, all high temperature air does not mix with air flowing on the rear surface of the curved mirror 42, i.e., the temperature is not lowered, and is discharged from the exhaust port 85, resulting in the temperature of the exhaust port 85 being increased. Accordingly, in a case in which some of the air that is discharged from the light source air exhaust port 64c and flows through the fluid guide 87 flows through the space surrounded by the main PFC power source board 80a and the sub PFC power source board 80b, the air can reliably mix with air flowing on the rear surface of the curved mirror 42 from the air intake port 84 and toward the exhaust port 85, which is safe for a user.

The operating unit 83 for a user to operate the apparatus is preferably provided on the upper surface of the apparatus for allowing the user to readily operate the apparatus. In the embodiment, the transmissive glass 51 used for projecting an image on the projection plane 101 is provided on the upper surface of the projector 1. Because of the structure, the operating unit 83 needs to be provided such that part of the operating unit 83 overlaps with the light source unit 60 when the projector 1 is viewed from the Y direction, i.e., from top view of the projector 1. That is, when the operating unit 83 is assumed as an operation plane having a certain area, the light source unit 60 is disposed on the normal line of any area of the operation plane. It can be also said that the light source unit 60 and the operating unit 83 are disposed on the normal line extended from the base member 53 having a platy shape.

In the embodiment, air having high temperature after cooling the light source 61 is discharged toward the exhaust port 85 by an air flow flowing from the air intake port 84 toward the exhaust port 85 in the space between the light source unit 60 and the operating unit 83, thereby enabling high temperature air to be prevented from flowing to the operating unit 83. As a result, an increase in the temperature of the operating unit 83 due to air having high temperature after cooling the light source 61 can be suppressed. In addition, part of air flowing from the air intake port 84 toward the exhaust port 85 through the second optical unit 40 flows directly under the operating unit 83 and cools the operating unit 83. This air flow can also suppress an increase in the temperature of the operating unit 83.

Air suction by the exhaust fan 86 causes ambient air to be sucked in from the power source air intake port 56 provided to the base member 53 illustrated in FIG. 18. A ballast substrate 3a (refer to FIGS. 24 and 25) that supplies stable power (current) to the light source 61 is disposed on the far side in the X-direction in FIG. 21 with regard to the light source housing 97. Ambient air taken in from the power source air intake port 56 cools the ballast substrate 3a while flowing upward in the space between the light source housing 97 and the ballast substrate 3a. Thereafter, the air flows in the space surrounded by the power source unit 80 disposed above the ballast substrate 3a and is then discharged from the exhaust port 85 by the exhaust fan 86.

In the embodiment, a fan that generates an air flow flowing from the air intake port 84 toward the exhaust port 85 is provided on the exhaust side as the exhaust fan 86, thereby enabling a supplying amount of air supplied to the inside of the apparatus from the air intake port 84 to be further increased than a case when the fan is provided to the air intake port 84. When the fan is provided to the air intake port 84, the volume of ambient air supplied from the fan to the inside of the apparatus is reduced by the second optical unit 40 because the second optical unit 40 is disposed in a direction in which the fan sends air. In contrast, when the fan is disposed on the exhaust port 85 side as the exhaust fan 86, the volume of air discharged by the exhaust fan 86 is not reduced because no obstacles are usually disposed on an air exhaust side of the exhaust port 85. Accordingly, air of the same amount as air discharged by the exhaust fan 86 is taken in from the air intake port 84, resulting in a supplying amount of air supplied from the air intake port 84 to the inside of the apparatus not being reduced. As a result, air can flow at a certain pressure from the air intake port 84 toward the exhaust port 85, thereby enabling heated air ascending from the light source 61 to be well directed toward the exhaust port 85 by the air flow flowing from the air intake port 84 to the exhaust port 85.

On the lower left side of the apparatus body in FIG. 20, a cooling section 120 is disposed that cools the heat sink 13 of the image forming unit 10 and the light source bracket 62 of the light source unit 60, for example. The cooling section 120 includes the air intake blower 91, a vertical duct 92, and a horizontal duct 93.

The air intake blower 91 is disposed under the air intake port 84 so as to face the air intake port 84. The air intake blower 91 sucks in ambient air through the air intake port 84 from a surface thereof facing the air intake port 84 and sucks in air inside the apparatus from another surface opposite the surface facing the air intake port 84, and supplies the sucked air to the vertical duct 92 disposed below the air intake blower 91. Air flowing in the vertical duct 92 flows downward and to the horizontal duct 93 connected to the downward portion of the vertical duct 92.

In the horizontal duct 93, the heat sink 13 is disposed. The heat sink 13 is cooled by air flowing in the horizontal duct 93. The heat sink 13 cooled in this way can efficiently cool the DMD 12 and prevent the DMD 12 from reaching high temperature.

Air after flowing in the horizontal duct 93 flows through the passage 65 or the opening 65a provided to the light source bracket 62 of the light source unit 60 illustrated in FIG. 4. Air after flowing in the opening 65a flows in the space between the open-close cover 54 and the light source bracket 62, and cools the open-close cover 54.

On the other hand, air flowing through the passage 65 cools the light source bracket 62 and thereafter flows in a space opposite the emission side of the light source 61 to cool a side opposite the reflection surface of the reflector of the light source 61, thereby cooling the reflector of the light source 61. That is, air flowing through the passage 65 takes away heat from both the light source bracket 62 and the light source 61. Air passed through the vicinity of the reflector flows through an exhaust duct 94 that guides air existing from the level of the light source bracket 62 to approximately the lower portion of the exhaust fan 86, and thereafter mixes with air discharged from the light source air exhaust port 64c and reaches the exhaust port 85 through the fluid guide 87. Then, the air is discharged via the exhaust port 85 by the exhaust fan 86. Air flowing in the space between the open-close cover 54 and the light source bracket 62 through the opening 65a cools the open-close cover 54 and thereafter flows in the inside of the apparatus and is discharged from the exhaust port 85 by the exhaust fan 86.

In the projector 1 of the embodiment, the image forming section 100A (the image forming unit 10 and the lighting unit 20) and the projection optical section 100B (the first optical unit 30 and the second optical unit 40) are disposed in the Y direction (up-down direction) in a layered manner, and an image is projected from the upper surface of the projector 1 toward the projection plane 101. In addition, the light source unit 60 is disposed in the Z direction relative to the lighting unit 20, thereby shortening the length of the projector 1 in the direction orthogonal to the projection plane 101 (the X direction). The operating unit 83 for a user to operate the apparatus is preferably provided on the upper surface of the projector 1 for allowing the user to readily operate the apparatus. In the embodiment, the transmissive glass 51 used for projecting an image on the projection plane 101 is provided on the upper surface of the projector 1. Because of the structure, the operating unit 83 needs to be provided in such a position that the operating unit 83 overlaps with the light source 61 when the projector 1 is viewed from the Y direction.

When the operating unit 83 is disposed in such a position that the operating unit 83 overlaps with the light source 61 when the projector 1 is viewed from the Y direction as described above, air heated by the light source 61 ascends to and collides with the operating unit 83, and the operating unit 83 may reach high temperature.

In the embodiment, ascending air heated by the light source 61 is discharged toward the exhaust port 85 by an air flow flowing from the air intake port 84 toward the exhaust port 85 in the space between the light source unit 60 and the operating unit 83 as describe above, thereby enabling the heated air to be prevented from colliding with the operating unit 83 and the operating unit 83 from reaching high temperature. Even if the ascending air collides with the operating unit 83, air heated by the light source 61 mixes with low temperature air taken in from the air intake port 84, resulting in the temperature being lowered, and collides with the operating unit 83. As a result, an increase in the temperature of the operating unit 83 can be suppressed. In addition, part of air flowing from the air intake port 84 toward the exhaust port 85 cools the operating unit 83 while flowing directly under the operating unit 83. This air flow can also suppress an increase in the temperature of the operating unit 83.

Air heated through the light source housing 97 by thermal conduction and radiation heat from the light source 61 also ascends toward the operating unit 83 disposed above the light source 61. The heated air can also flow toward the exhaust port 85 by the air flow flowing from the air intake port 84 to the exhaust port 85. As a result, the collision of the heated air with the operating unit 83 is suppressed, thereby enabling an increase in the temperature of the operating unit 83 to be suppressed.

Figure 27:
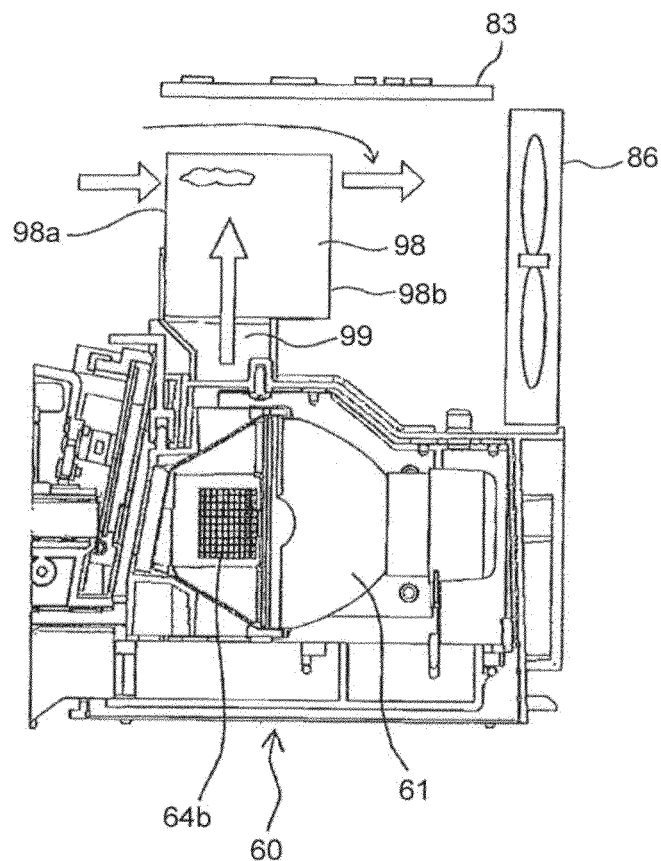
FIG. 27 is a schematic diagram to explain a modification of the embodiment.

As illustrated in FIG. 27, a mixing duct 98 that receives air discharged from the light source and ascending from the light source housing 97 and mixes the discharged air with low temperature air flowing from the air intake port 84 may be provided between the light source 61 and the operating unit 83.

As illustrated in FIG. 27, the ends of the mixing duct 98 on the near side and the far side in the Z-axis direction are open. The light source housing 97 is provided with a light source exhaust duct 99 that forms a flow path guiding air discharged from the light source upward in the vertical direction and causes the discharged air to flow in the mixing duct 98. One end of the light source exhaust duct 99 is connected to an opening of the light source housing 97 formed just above the light source air exhaust port 64c of the holder 64 while the other end of the light source exhaust duct 99 is connected to an opening provided to a lower surface of the mixing duct 98.

Air temperature which is increased by taking heat of the light source 61 discharged from the light source air exhaust port 64c of the holder 64 ascends in the light source exhaust duct 99 by its ascending air current, suction power of the exhaust fan 86, and wind pressure of the light source blower 95, for example, and collides with an upper surface serving as a wall surface of the mixing duct 98.

Air after the collision with the upper surface of the mixing duct 98 mixes with low temperature air flowing in the mixing duct 98 through an inflow vent 98a opened on the left side of the mixing duct 98 in FIG. 27 from the air intake port 84 and through the second optical unit 40. As a result, the temperature of air discharged from the light source is lowered and the air flows toward the exhaust fan 86. The air of which the temperature is lowered flows out from an outflow vent 98b opened on the exhaust fan 86 side of the mixing duct 98. The outflow mixes with air flowing from an outer circumference of the mixing duct 98 and the temperature of mixed air is further lowered, and thereafter the mixed air is discharged outside the apparatus by the exhaust fan 86.

The mixing duct 98 thus provided can prevent air heated by the light source 61 from colliding with the operating unit 83.

The descriptions above are represented by way of example, and the invention provides particular effects in the following aspects (1) to (3).

(1) In the image projection apparatus including the light source unit 60, the image forming section 100A that forms an image using light from the light source unit 60 (in the embodiment, the image forming section 100A is made up of the image forming unit 10 and the lighting unit 20), the curved mirror 42 having a concave shape, the projection optical section 100B that projects the image (in the embodiment, made up of the first optical unit 30 and the second optical unit 40), and the operating unit 83 for a user to operate the apparatus, the operating unit 83 is disposed on the upper surface of the apparatus and above the light source unit 60. The apparatus further includes the air intake port 84 that takes ambient air into the inside of the apparatus, the exhaust port 85 that discharges air inside the apparatus, and the air supplying unit such as the exhaust fan 86 that supplies air by sucking in ambient air from the air intake port 84 and supplying air so as to exhaust air from the exhaust port 85. At least part of the air intake port 84 and at least part of the exhaust port 85 are disposed so as to be between the light source unit 60 and the operating unit 83. The curved mirror 42 having a concave shape is disposed such that air flowing from the air intake port 84 toward the exhaust port 85 flows along the rear surface of the curved mirror 42.

This structure produces an air flow flowing from the air intake port toward the exhaust port in the space between the light source unit 60 and the operating unit 83 as described in the embodiment. This air flow enables ascending air heated by heat of the light source unit 60 to flow toward the exhaust port 85 and to be discharged. As a result, the collision of air heated by the light source unit 60 with the operating unit 83 disposed above the light source unit 60 can be suppressed and an increase in the temperature of the operating unit 83 can be suppressed. In addition, the curved mirror 42 having a concave shape is disposed such that air flowing from the air intake port 84 toward the exhaust port 85 flows along the rear surface of the curved mirror 42 having a concave shape, enabling ambient air taken in from the air intake port 84 to flow in the space between the light source 61 in the apparatus and the operating unit 83 while maintaining its momentum when taken in and discharged from the exhaust port 85. Air heated by the light source 61 mixes with low temperature air and is discharged from the exhaust port 85 as describe above, thereby enabling air discharged from the exhaust port 85 to be prevented from reaching high temperature.

(2) In the image projection apparatus according to the first aspect, the air supplying unit is provided to the exhaust port 85 side.

This structure enables a supplying amount of air capable of being taken into the inside of the apparatus to be further increased than a case when the air supplying unit is provided to the air intake port 84 side as described in the embodiment. As a result, air heated by the light source 61 can be well transferred to the exhaust port 85 by the air flow flowing from the air intake port 84 toward the exhaust port 85.

(3) In the image projection apparatus according to any one of the first and the second aspects, the projection optical section 100B is disposed on the image forming section 100A while the light source 61 and the image forming section 100A are arranged in a direction in parallel with a plane of a projection image projected on the projection plane 101 and the apparatus body, and the image is projected from the upper surface of the apparatus toward the projection plane 101.

This structure enables the length of the apparatus in a direction orthogonal to the projection plane 101 to be shortened. As a result, an installation space of the apparatus can be prevented from being largely taken in the direction orthogonal to the plane of a projection image projected on the projection plane 101. Consequently, when the image projection apparatus is used while placed on a desk, for example, the apparatus can be prevented from hindering the arrangement of the desk and chairs in a small room.

According to the embodiments, air that is heated by the light source and ascends in the apparatus and heated air are caused to flow toward the exhaust port through a second flow path formed between the light source and the operating unit, thereby enabling the operating unit to be further suppressed from being heated than in conventional ways. Air that is heated by heat conducted from the light source by thermal conduction and the light source and ascends in the apparatus mixes with air flowing in the second flow path different from a first flow path, thereby lowering the temperature of the air. Consequently, an increase in the temperature of the operating unit can be suppressed even when the operating unit is disposed above the light source when viewed from the placement surface on which the apparatus body is placed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus for projecting an image using light, comprising:
    a light source configured to emit the light;
    an operating unit configured to allow a user to operate the image projection apparatus, the operating unit being disposed above the light source when viewed from a placement surface on which a main body of the image projection apparatus is placed;
    a first flow path in which air flows through the light source; and
    a second flow path different from the first flow path, the second flow path being formed between the light source and the operating unit,
    wherein the air in the first flow path flows upwards from the light source towards the operating unit and into the second flow path.

2. The image projection apparatus according to claim 1, further comprising:
    an intake port configured to take air in inside of the image projection apparatus, the intake port being disposed in a first side of the main body;
    an exhaust port configured to discharge air inside the main body, the exhaust port being disposed in a second side facing the first side, wherein
    at least part of the intake port and at least part of the exhaust port are disposed so as to be between the light source and the operating unit when viewed from a direction parallel to the placement surface, and
    the second flow path allows air taken in from the intake port and discharged via the exhaust port to flow therein.

3. The image projection apparatus according to claim 2, wherein
    a portion of the first flow path is formed between the light source and the operating unit when viewed from the direction parallel to the placement surface by a guide member that guides air flowing through the light source toward the exhaust port, and
    the first flow path joins the second flow path between the light source and the operating unit when viewed from the direction parallel to the placement surface.

4. The image projection apparatus according to claim 1, further comprising an image forming element configured to form an image using the light emitted from the light source,
    wherein the second flow path is formed by a concave mirror disposed in an optical path between the image forming element and a projection plane to reflect the image formed by the image forming element toward the projection plane.

5. The image projection apparatus according to claim 4, wherein
    a rear surface of the concave mirror is a curved surface conforming to a shape of a front surface of the concave mirror, and
    the second flow path is formed by the rear surface of the concave mirror.

6. The image projection apparatus according to claim 1, further comprising:
    a light source bracket; and
    a holder which holds the light source above the light source bracket at a light emission side of the light source,
    wherein the holder includes a light source air intake provided on a side surface of the holder and a light source exhaust port provided on an upper surface of the holder, the air of the first flow path flowing into the light source air intake and through the light source, and discharging from the light source exhaust port.

7. The image projection apparatus according to claim 6, further comprising:
    a light source blower which takes in air surrounding a color motor rotating a color wheel and flows the air in the light source air intake via a light source duct.

8. The image projection apparatus according to claim 1, wherein the second flow path is vertically disposed above the first flow path.

9. The image projection apparatus according to claim 1, wherein a position of the operation unit in a transverse direction perpendicular to a vertical direction and a position of the light source in transverse direction are the same.

* * * * *